United States Patent
Iida et al.

(10) Patent No.: US 6,625,713 B2
(45) Date of Patent: Sep. 23, 2003

(54) MEMORY CONTROLLER AND METHOD FOR MANAGING A LOGICAL/PHYSICAL ADDRESS CONTROL TABLE

(75) Inventors: Kenichi Iida, Saitama (JP); Noriyuki Koga, Chiba (JP); Eiichi Yamada, Tokyo (JP); Mari Sugiura, Tokyo (JP); Shuji Obayashi, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/100,722

(22) Filed: Mar. 19, 2002

(65) Prior Publication Data

US 2002/0124130 A1 Sep. 5, 2002

Related U.S. Application Data

(62) Division of application No. 09/357,796, filed on Jul. 20, 1999.

(30) Foreign Application Priority Data

Jul. 28, 1998 (JP) .......................................... P10-212630

(51) Int. Cl.⁷ .......................... G06F 12/08; G06F 12/06
(52) U.S. Cl. ....................... 711/206; 711/202; 711/203; 711/205; 711/207; 711/208; 711/209
(58) Field of Search .......................... 717/118; 711/202, 711/203, 205, 206, 207, 208, 209, 102, 104

(56) References Cited

U.S. PATENT DOCUMENTS

| | | | | |
|---|---|---|---|---|
| 4,373,179 A | * | 2/1983 | Katsumata | 711/207 |
| 4,755,985 A | * | 7/1988 | Jayapalan et al. | 370/384 |
| 5,937,193 A | * | 8/1999 | Evoy | 717/118 |
| 6,377,500 B1 | * | 4/2002 | Fujimoto et al. | 365/230.01 |

* cited by examiner

Primary Examiner—B. James Peikari
(74) Attorney, Agent, or Firm—Jay H. Maioli

(57) ABSTRACT

A memory controller for reading data stored in a nonvolatile memory that includes a number of erasable blocks containing a number of pages. A logical/physical address control table stored in a logical/physical address control table block of the nonvolatile memory is searched, read, and manipulated in the nonvolatile memory.

9 Claims, 16 Drawing Sheets

FIG. 5A
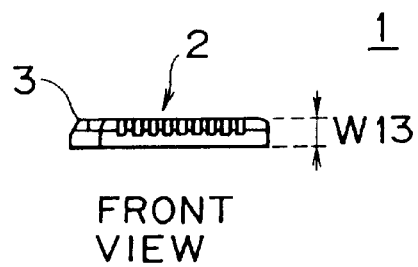
FRONT VIEW
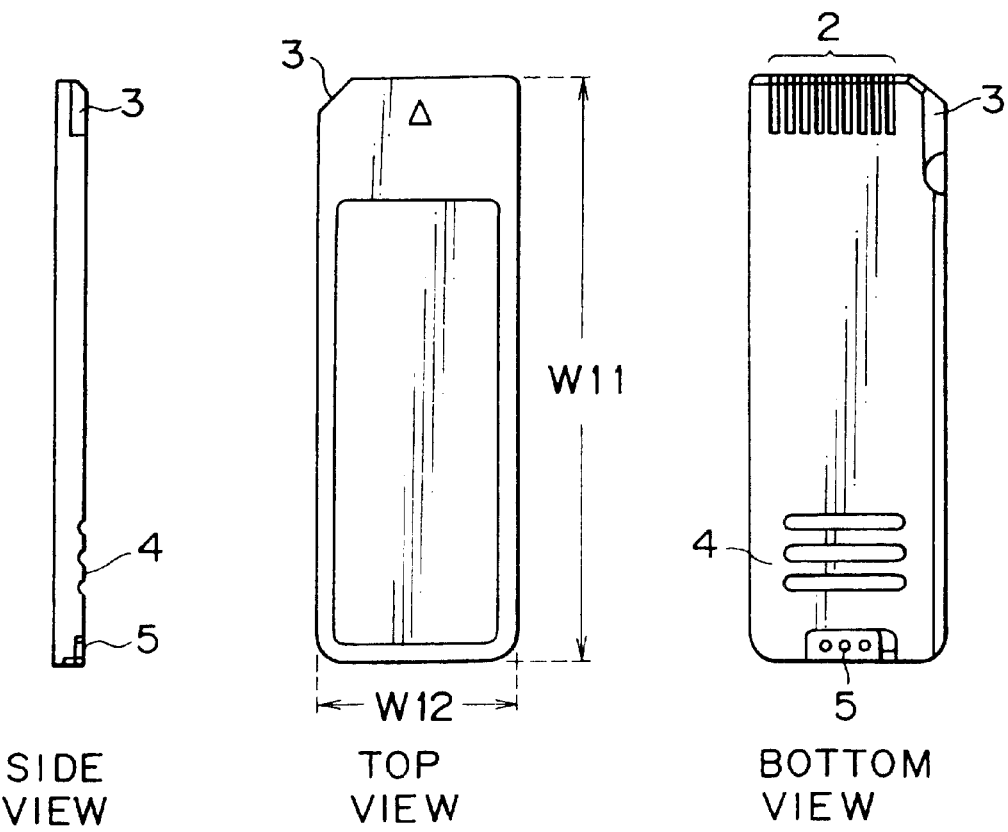
FIG. 5C  FIG. 5B  FIG. 5D
SIDE VIEW  TOP VIEW  BOTTOM VIEW

PROCESSING HIERARCHY
OF A FILE SYSTEM

MANAGEMENT FLAG

| BIT | DEFINITION |
|---|---|
| 7 | RESERVED |
| 6 | RESERVED |
| 5 | ACCESS PERMISSION<br>(1: FREE, 0: READ PROTECTED) |
| 4 | COPY PROHIBITED SPECIFICATION<br>(1: OK, 0: NG) |
| 3 | CONTROL-TABLE FLAG<br>(1: NOT A TABLE BLOCK, 0: TABLE BLOCK)<br>* VALID ONLY FOR THE LAST SEGMENT |
| 2 | SYSTEM FLAG<br>(1: USER BLOCK, 0: BOOT BLOCK) |
| 1 | RESERVED |
| 0 | RESERVED |

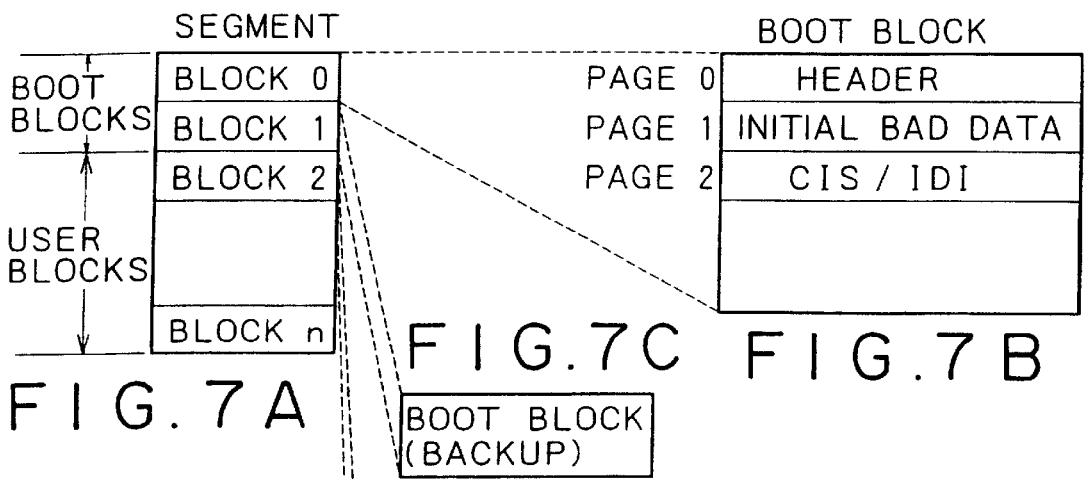
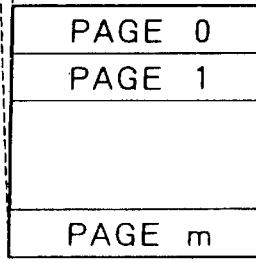
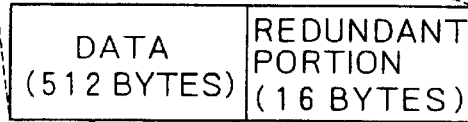
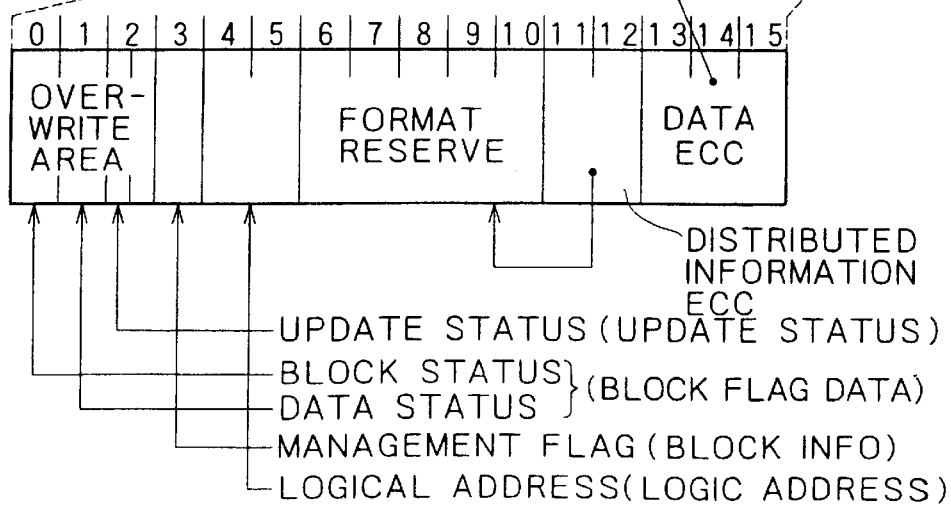
FIG. 7A  FIG. 7B  FIG. 7C  FIG. 7D  FIG. 7E  FIG. 7F

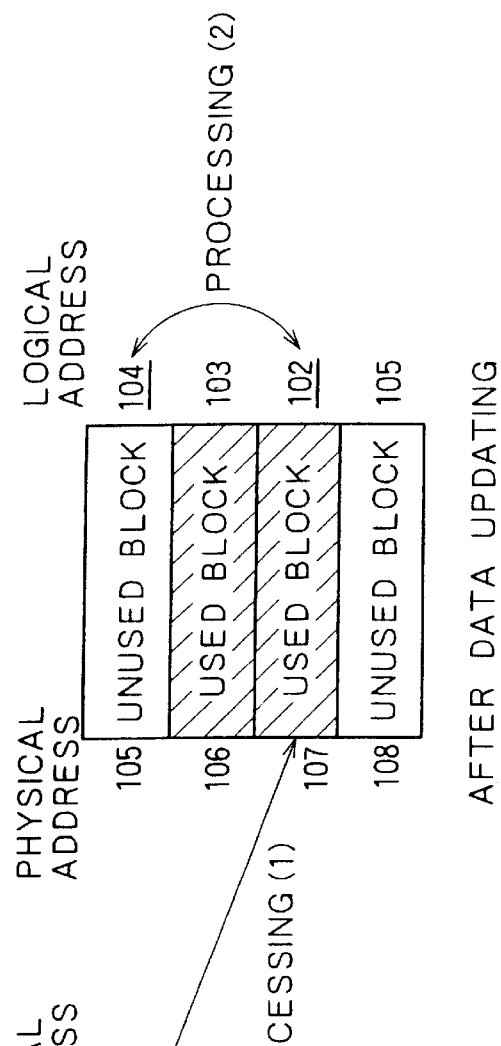

FIG.10

| PHYSICAL ADDRESS (2 BYTES) | | LOGICAL ADDRESS (2 BYTES) |
|---|---|---|
| 0×00 | 0×03 | ← LOGICAL ADDRESS 0×0000 |
| 0×00 | 0×04 | ← LOGICAL ADDRESS 0×0001 |
| 0×00 | 0×04 | ← LOGICAL ADDRESS 0×0002 |
| 0×00 | 0×05 | ← LOGICAL ADDRESS 0×0003 |
| 0×01 | 0×A8 | ← LOGICAL ADDRESS 0×0004 |
| 0×00 | 0×06 | ← LOGICAL ADDRESS 0×0005 |

PHYSICAL ADDRESSES ASSOCIATED WITH LOGICAL ADDRESSES ARE STORED IN AN ORDER THE LOGICAL ADDRESSES ARE ARRANGED.

EMBODIMENT

F I G. 13

| FLASH MEMORY CAPACITY | BLOCK COUNT | BLOCK SIZE | PAGE SIZE | LOGICAL/PHYSICAL ADDRESS CONTROL TABLE SIZE |
|---|---|---|---|---|
| 4MB | 512 (1 SEGMENT) | 8KB (16 pages) | (512+16)B | 1KB (2 pages) |
| 8MB | 1024 (2 SEGMENTS) | 8KB (16 pages) | (512+16)B | 2KB (4 pages) |
| 16MB | 2048 (4 SEGMENTS) | 8KB (16 pages) | (512+16)B | 4KB (8 pages) |
| 32MB | 1024 (2 SEGMENTS) | 16KB (32 pages) | (512+16)B | 2KB (4 pages) |
| 32MB | 2048 (4 SEGMENTS) | 16KB (32 pages) | (512+16)B | 4KB (8 pages) |
| 64MB | 4096 (8 SEGMENTS) | 16KB (32 pages) | (512+16)B | 8KB (16 pages) |
| 128MB | 8192 (16 SEGMENTS) | 16KB (32 pages) | (512+16)B | 16KB (32 pages) |

FIG.14A

| LOGICAL ADDRESS | PHYSICAL ADDRESS | SEGMENT 0 | |
|---|---|---|---|
| | 0×0000 | BLOCK 0 | |
| | 0×0001 | BLOCK 1 | |
| 0×0001 | 0×0002 | BLOCK 2 | |
| 0×0000 | 0×0003 | BLOCK 3 | |
| 0×0004 | 0×0004 | BLOCK 4 | |
| 0×0003 | 0×0005 | BLOCK 5 | |
| 0×0002 | 0×0006 | BLOCK 6 | |
| | | ... | |
| 0×0005 | 0×007B | BLOCK 123 | |
| | | ... | |
| 0×01FD | 0×01FF | BLOCK 511 | |

FIG.14B

| | DATA | REDUNDANT PORTION |
|---|---|---|
| PAGE 0 | MAIN DATA | 1 0001 |
| PAGE 1 | MAIN DATA | |
| PAGE 2 | MAIN DATA | |
| ... | | |
| PAGE 15 | MAIN DATA | |

↑ LOGICAL ADDRESS
  CONTROL TABLE FLAG

FIG.14C

| | DATA | REDUNDANT PORTION |
|---|---|---|
| PAGE 0 | CONTROL DATA | 0 0005 |
| PAGE 1 | CONTROL DATA | |
| PAGE 2 | UNUSED | |
| ... | | |
| PAGE 15 | UNUSED | |

↑ LOGICAL ADDRESS
  CONTROL TABLE FLAG

FIG.14D

| FOR LOGICAL ADD.0 | FOR LOGICAL ADD.1 | FOR LOGICAL ADD.2 | FOR LOGICAL ADD.3 | FOR LOGICAL ADD.4 | FOR LOGICAL ADD.5 | ... | FOR LOGICAL ADD.493 |
|---|---|---|---|---|---|---|---|
| 0003 | 0002 | 0006 | 0005 | 0004 | 007B | ... | 01FF |

2 BYTES

F I G. 18
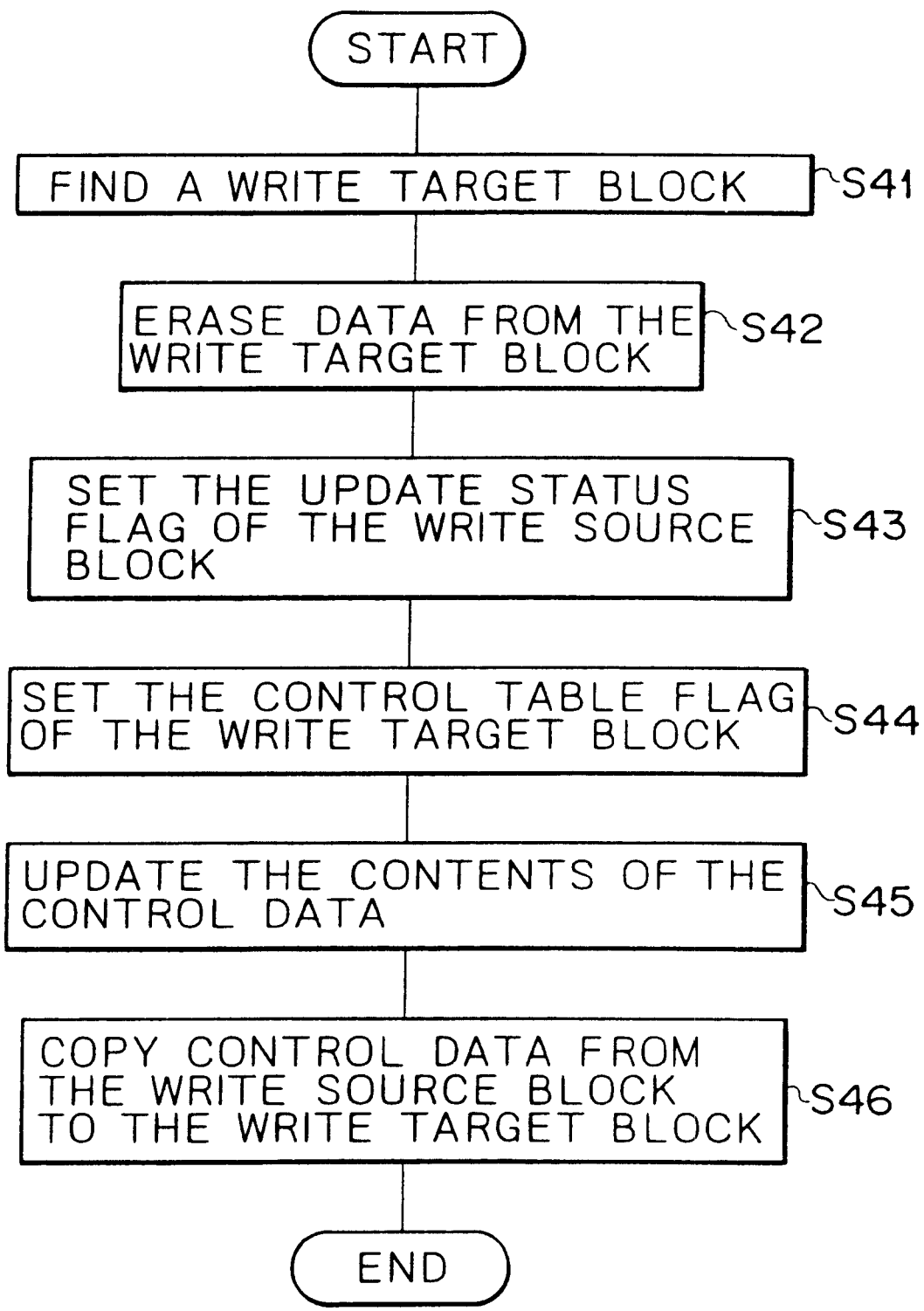

MEMORY CONTROLLER AND METHOD FOR MANAGING A LOGICAL/PHYSICAL ADDRESS CONTROL TABLE

This is a division of prior application Ser. No. 09/357,796 filed Jul. 20, 1999.

FIELD OF THE INVENTION

The present invention relates to a non-volatile memory including a logical/physical address control table used for controlling the non-volatile memory in which data is recorded discretely. The memory is composed of a plurality of blocks, each block serving as a data deletion unit and comprising adjacent pages each of which has a fixed length and serves as a data read/write unit. The invention relates to a recording apparatus as well as to a recording method for generating control data cataloged in the logical/physical address control table and used in the non-volatile memory.

BACKGROUND OF THE INVENTION

In recent years, there has been developed a compact storage device that includes solid-state storage, such as a flash memory, and that is mounted on various kinds of equipment, such as a video camera, to store video, audio and computer data.

Since such a storage device is more compact than the other storage mediums, such as a 3.5-inch floppy disc, and employs a drive with a small size, the device can be readily mounted on equipment such as a video camera, an audio recording apparatus and a portable computer apparatus.

Incidentally, a flash memory has the characteristic that the length of its life is affected by the number of repeated writing and erasing operations. With regard to a file system for writing and reading data to and from a storage device utilizing a flash memory like the one described above, the concept of having logical addresses and physical addresses has been introduced. In a configuration employing this concept, operations to write and read out data into and from the storage device are carried out by utilizing the logical and physical addresses.

In order to access the storage device implemented by a flash memory, it is necessary to provide a table showing the relationship between the logical addresses and the physical addresses. Such a table is referred to hereafter as the logical/physical address control table.

In the conventional system, a logical/physical address control table is provided in the main unit utilizing the storage device.

It is noted that, a large logical/physical address control table has a typical data size of about 18 KB depending on the device. On the other hand, the storage capacity of RAM (Random Access Memory) embedded in a 1-chip microprocessor employed in the main apparatus is only several tens of KB at the most. Thus, if the logical/physical address control table is included in the RAM, most of the storage area of the RAM will be occupied by the logical/physical address control table. Therefore, it is quite difficult to store the logical/physical address control table in the RAM embedded in the microprocessor without sacrificing processing performance of the microprocessor. In addition, a low-cost microprocessor may have a RAM capacity of only about 10 KB. In this case, it is impossible to store the logical/physical address control table in the RAM because the size of the logical/physical address control table is larger than the RAM capacity.

To solve the problems described above, the main unit with the storage device formed of a flash memory is provided with an external RAM to store the logical/physical address control table.

An external RAM, however, causes the problems of increased cost, as well as increased power consumption due to the additional power required to drive the external RAM. In particular, if the main apparatus is a portable, battery-powered unit, the increased power consumption adversely affects the life of the battery.

In addition, information recorded in the logical/physical address control table stored in the external RAM is cleared when the storage device is removed from the main unit, and information is recorded in the logical/physical address control table each time the storage device is inserted in the main unit.

In generating of a logical/physical address control table, the microprocessor of the main unit checks the internal state of the storage device and constructs the information in the logical/physical address control table as part of a file-management system. Then, the logical/physical address control table is stored in the external RAM.

It takes at least several seconds to carry out such preparatory processing. In the case of a low-cost microprocessor with a small processing ability, this time increases significantly. For example, since access to write or read out data to or from the storage device can be made only after the preparatory processing is completed, this time appears to the user as an annoying waiting time. If use of the equipment in a way the user likes is taken into consideration, the time it takes to carry out such preparation processing needs to be shortened as much as possible.

SUMMARY OF THE INVENTION

It is an object of the present invention to provide a non-volatile memory including a logical/physical address control table and a recording method and apparatus for generating instruction data cataloged in the logical/physical address control table to access the non-volatile memory, whereby the non-volatile memory permits the use of a microprocessor having only a small work memory to access the non-volatile memory.

According to a first aspect of the present invention, there is provided a non-volatile memory that allows a microprocessor having only a small work memory, wherein a storage area of the non-volatile memory comprises an operand data area formed of the blocks making up a plurality of adjacent pages, each page used for recording an identifier for distinguishing operand data from control data and for recording main data. The storage area further comprises an instruction data area formed of the blocks making up the plurality of adjacent pages, each page used for recording an identifier for distinguishing operand data and instruction data from each other and for recording control data representing relations associating logical addresses with physical addresses wherein the logical addresses, are assigned to the data written into the blocks and the physical addresses respect a physical layout of the blocks.

According to a second aspect of the present invention, a recording apparatus generates control data cataloged in the logical/physical address control table and used in accessing the non-volatile memory includes: an attribute determining unit for determining whether data to be written into non-volatile memory is operand data or instruction data; a generating means for generating an identifier indicating whether the data to be written into the non-volatile memory is operand data or instruction data in accordance with a result of determination output by the attribute determining unit; and a memory controller for synthesizing the data to be written into the nonvolatile memory and the identifier output by the identifier and for writing synthesized data into the non-volatile memory.

According to a third aspect of the present invention, a recording method generates control data cataloged in the logical/physical address control table for accessing the non-volatile memory includes the steps of: determining whether data to be written into the non-volatile memory is operand data or instruction data; generating an identifier indicating whether the data to be written into the non-volatile memory is operand data or instruction data in accordance with a result of the determining step; and synthesizing the data to be written into the nonvolatile memory and the identifier output of the generating step and writing synthesized data into the non-volatile memory.

BRIEF DESCRIPTION OF THE DRAWINGS

FIG. 5A is a diagram showing a front view of the external shape of the planar memory;

FIG. 5B is a diagram showing a top view of the external shape of the planar memory;

FIG. 5C is a diagram showing a side view of the external shape of the planar memory FIG. 5D is a diagram showing a bottom view of the external shape of the planar memory;

FIG. 7A is an explanatory diagram showing a segment in a physical data structure of a flash memory;

FIG. 7B is an explanatory diagram showing a boot block in the physical data structure of the flash memory;

FIG. 7C is an explanatory diagram showing a backup of a boot block in the physical data structure of the flash memory;

FIG. 7D is an explanatory diagram showing a block in the physical data structure of the flash memory;

FIG. 7E is an explanatory diagram showing a page in the physical data structure of the flash memory;

FIG. 7F is an explanatory diagram showing a redundant portion of the page in the physical data structure of the flash memory;

FIG. 9A is an explanatory diagram showing a pre-processing state in description of the concept of processing to update data in a flash memory, a logical address and physical address;

FIG. 9B is an explanatory diagram showing a post-processing state in the description of the concept of processing to update data in a flash memory, a logical address and a physical address;

FIG. 10 is an explanatory diagram used for conceptually describing the concept of managing a logical/physical address control table;

FIG. 13 is an explanatory diagram showing relations between the storage capacity of a flash memory, the number of blocks, the size of a block, the size of a page and the size of the logical/physical address control table;

FIG. 14A is an explanatory diagram showing the physical data structure of a segment in a flash memory provided by the embodiment;

FIG. 14B is an explanatory diagram showing the physical data structure of a operand-data block in the flash memory provided by the embodiment;

FIG. 14C is an explanatory diagram showing the physical data structure of a instruction-data block in the flash memory provided by the embodiment;

FIG. 14D is an explanatory diagram showing the structure of the logical/physical address control table in the flash memory provided by the embodiment;

FIG. 18 shows a flowchart representing a method of rewriting instruction data in the recording apparatus implemented by the embodiment.

DETAILED DESCRIPTION OF THE PREFERRED EMBODIMENTS

Figure 1:
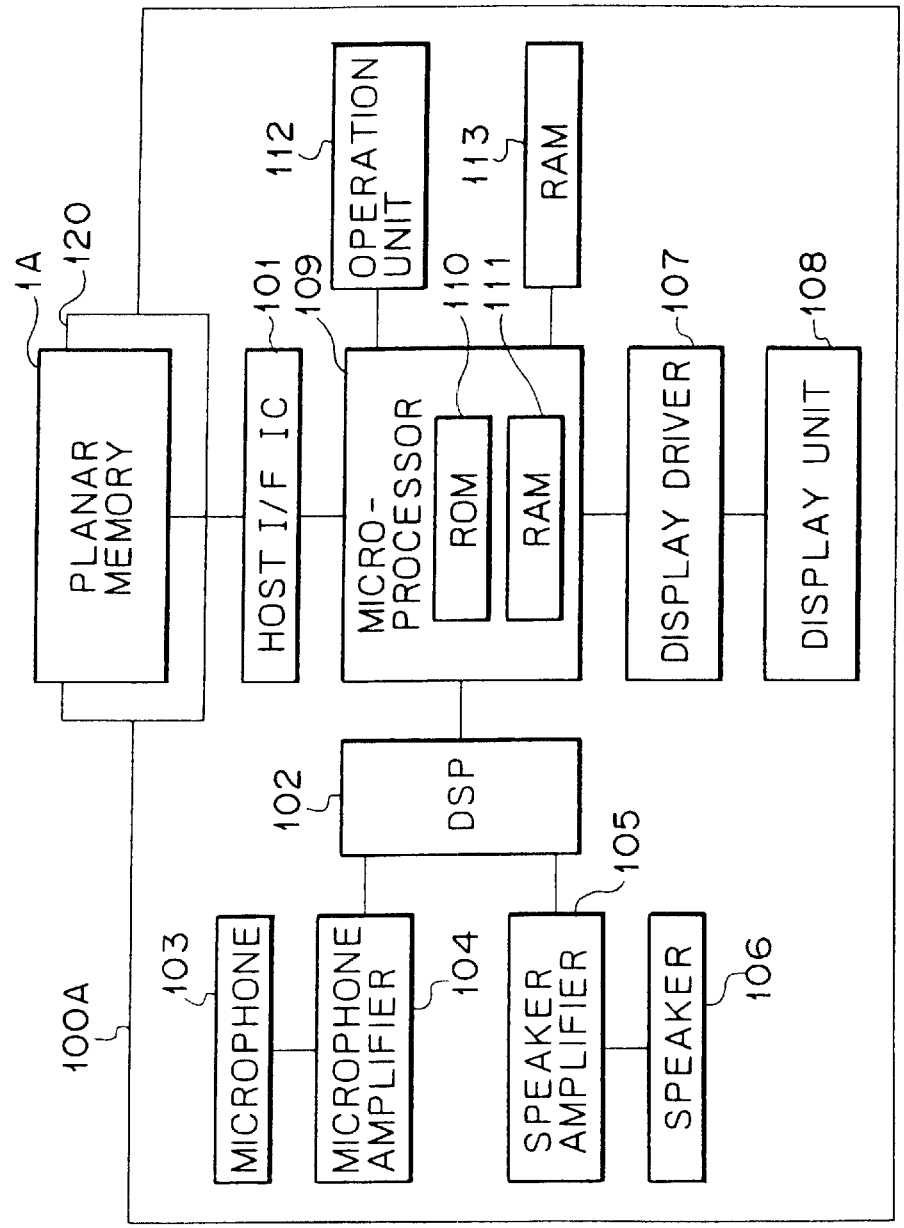
FIG. 1 is a block diagram showing the configuration of a conventional system comprising a main apparatus and a planar memory for comparison with an embodiment of the present invention.

An embodiment of the present invention will be described below. It should be noted that a storage device provided by the embodiment is a planar memory having a planar external shape.

The embodiment will be described in the following order:
1. External Shape of the Memory
2. Memory Format
2-1. Processing Hierarchy of a Memory File System
2-2. Physical Data Structure
2-3. Concept of Physical and Logical Addresses
2-4. Logical Physical Address Control table of the Embodiment

3. System Configuration

1. External Shape of the Memory

The description begins with the planar shape of a planar memory 1, which is a storage device provided by an embodiment of the present invention, with reference to FIGS. 5A, 5B, 5C and 5D.

The planar memory 1 is implemented by a memory device enclosed in a planar case as shown in FIGS. 5A, 5B, 5C and 5D and having a predetermined storage capacity. In this embodiment, the memory device is a flash memory.

FIGS. 5A, 5B, 5C, and 5D are diagrams showing, respectively, a top view, a front view, a side view, and a bottom view of the case which is, formed of molded plastic having a length W11 of 60 mm, a width W12 of 20 mm, as shown in FIG. 5B, and a height W13 of 2.8 mm as shown in FIG. 5A.

The terminal unit 2 formed on the surface of the case has 9 electrodes disposed so as to extend from a lower portion of the front side to the bottom side. Data is written into or read out from the internal memory device through the terminal unit 2.

A relieved corner 3 is formed at the upper left corner of the case. The relieved corner 3 prevents the planar memory 1 from being incorrectly inserted into a mounting/dismounting mechanism of the main apparatus.

On the bottom of the case, a grooved surface 4 is created to improve gripping of the case by the fingers of the user.

A slide switch 5 is also formed on the bottom to prevent inadvertent erasure of data stored in the internal memory device.

2. Memory Format

2-1. Processing Hierarchy of a Memory File System

The next description explains a format adopted in the system wherein the planar memory 1 is used as a recording medium.

Figures 6, 8:
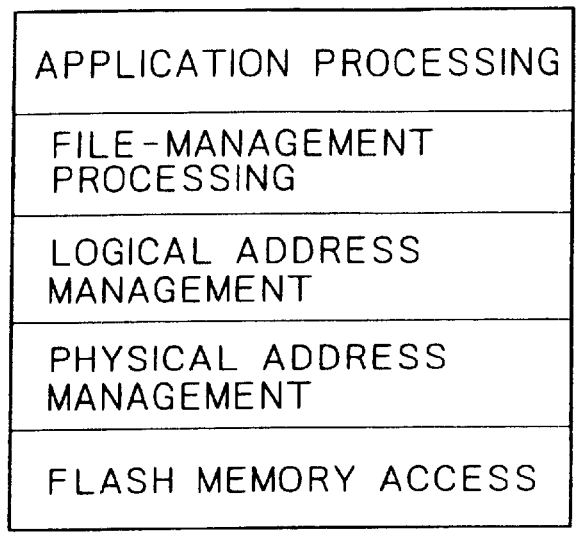
FIG. 6 is an explanatory diagram showing a processing hierarchy of a file system provided by the embodiment.
FIG. 8 is an explanatory diagram showing the contents of a management flag.

FIG. 6 is an explanatory diagram showing a file-system processing hierarchy of the system, wherein the file-system processing hierarchy comprises an application processing layer at the top followed sequentially by a file-management processing layer, a logical-address layer, a physical-address layer and a flash-memory access layer at the bottom of the hierarchy. The file-management processing layer in the hierarchy is the so-called FAT (File Allocation Table) file system. As is also seen from FIG. 6, the file system of the embodiment introduces the concept of logical and physical addresses that will be described later.

2-2. Physical Data Structure

FIGS. 7A to 7F are diagrams showing a physical data structure of a flash memory used as the storage device of the planar memory 1, in which the storage area of a flash memory is divided into segments, that is, basic data units each having a fixed length. The size of a segment is prescribed to be 4 MB or 8 MB. Thus, the number of segments constituting a flash memory varies depending on the capacity of the flash memory.

As shown in FIG. 7A, a segment is divided into blocks each of which is a data unit prescribed to have, a length of 8 KB or 16 KB. Each segment is divided into 512 blocks, namely, blocks 0 to n where n=511 as shown in FIG. 7A. A flash memory, however, can also include a defect area consisting of a predetermined number of blocks. A defect area is a damaged area into which data can not be written. Thus, the number of effective blocks into which data can be actually written is less than 512.

As shown in FIG. 7A, two blocks at the head, namely, blocks 0 to 1, are called boot blocks. Actually, however, any two blocks at the head of the effective blocks can be used as the boot blocks, so there is no assurance that the boot blocks are always blocks 0 and 1.

The remaining blocks are user blocks for storing user data. As shown in FIG. 7D, a user block is divided into pages 0 to m. As shown in FIG. 7E, a page comprises a data area of 512 bytes and a redundant portion of sixteen bytes to give a fixed size of 528 bytes. The structure of the redundant portion will be described later with reference to FIG. 7F.

The number of pages in a block is sixteen for a block size of 8 KB and thirty two for a block size of 16 KB.

The block structure shown in FIG. 7D and the page structure shown in FIG. 7E apply to both the boot blocks and the user blocks.

Data is written into and read out from a flash memory in page units, however, data is erased from a flash memory in block units. A flash memory is characterized in that data can not be written into an area in which other data has already been written. Thus, new or replaced data has to be written into a page that is shown by the file management system to be an unused area. The file management system changes the status of a block from 'used' status to 'unused' status by merely changing the data for that block in the table controlling the status of the blocks to a new value that indicates the block is an unused block, without erasing the contents of the block. For this reason, before writing data into this unused block, it is necessary to erase the contents thereof. Since contents can be erased in block units only, new or replaced data is actually written into the flash memory only in block units instead of page units.

As shown in FIG. 7B, a header is stored on page 0 of the first boot block. Information indicating an address indicating the position of initial bad data is stored on page 1. On page 2, information called a CIS/IDI (Card Information Structure/Identify Drive Information) is stored.

As shown in FIG. 7C, the second boot block is used as a backup area.

The 16-byte redundant portion shown in FIG. 7E has a structure shown in FIG. 7F.

As shown in FIG. 7F, the first three bytes of the redundant portion, namely, bytes 0 to 2, an overwrite area that can be rewritten depending on updating of the contents of the data area. To be more specific, byte 0 is used for storing block status and byte 1 is used for storing data status (Block Flag Data). A predetermined number of high-order bits in byte 2 are used for storing an update status.

Basically, contents of bytes 3 to 15 are fixed in accordance with data stored on the page. That is to say, these bytes are an area for storing information that can not be rewritten.

To be more specific, a management flag (Block Info) is stored in byte 3 and a logical address (Logic Address) is stored in an area comprising the following 2-byte area, namely, bytes 4 and 5.

The following 5-byte area comprising bytes 6 to 10 is used as a format reserve area. The following 2-byte area comprising bytes 11 and 12 is used for storing distributed information ECC (Error Correction Code) for error correcting data in the format reserve area.

The remaining bytes 13 to 15 are used for storing ECC data for error correcting for data stored in the data area shown in FIG. 7E.

As shown in FIG. 8, contents of bits 7 to 0 of the management flag stored in byte 3 of the redundant portion shown in FIG. 7F are defined individually. Bits 7, 6, 1 and 0 are identified reserved bits. Bit 5 includes a flag indicating whether an access allowance to the block is valid or invalid. To be more specific, a value of 1 indicates that an access to the block can be made freely while a value of 0 indicates that the block is read protected. Bit 4 includes a copy prohibited specification flag with a value of 1 meaning that a copy operation is allowed while a value of 0 means that a copy operation is prohibited. Bit 3 is a control table flag indicating whether the block is a block for storing a logical/physical address control table, which will be described later. To be more specific, a value of 0 set in bit 3 indicates that the block is for storing a logical/physical address control table. A value of 1 set in bit 3, on the other hand, indicates a denial, that is, the block is not for storing a logical/physical address control table. Bit 2 is a system flag. A value of 1 indicates that the block is a user block, while a value of 0 indicates that the block is a boot block.

Next, a relation between the storage capacity of a flash memory and the number of blocks or the number of segments is explained with reference to FIG. 13. As shown in the figure, the flash-memory storage capacity of the planar memory 1 is prescribed to be 4 MB, 8 MB, 16 MB, 32 MB, 64 MB or 128 MB.

In the case of the minimum storage capacity of 4 MB, the block size is prescribed to be 8 KB and the number of blocks is 512. That is, the storage capacity of 4 MB is equal to the size of a segment. A planar memory 1 with a flash-memory storage capacity of 8 MB comprises 1,024 blocks, each block prescribed to have a size of 8 KB as described above. The 1,024 blocks constitute 2 segments. In addition, as described above, a 8-KB block comprises 16 pages.

In the case of a planar memory 1 with a flash-memory storage capacity of 16 MB, however, the size of a block can be 8 KB or 16 KB. Thus, the planar memory 1 can comprise 2,048 8-KB blocks (or 4 segments) or 1,024 16-KB blocks (or 2 segments). A 16-KB block comprises 32 pages.

In the case of a planar memory 1 with a flash-memory storage capacity of 32 MB, 64 MB or 128 MB, the size of a block is prescribed to be 16 KB only. Thus, a planar memory 1 with a flash-memory storage capacity of 32 MB comprises 2,048 blocks (or 4 segments) and a planar memory 1 with a flash-memory storage capacity of 64 MB comprises 4,096 blocks (or 8 segments). On the other hand, a planar memory 1 with a flash-memory storage capacity of 128 MB comprises 8,192 blocks (or 16 segments).

2-3. Concept of Physical and Logical Addresses

The following description explains the concept of physical and logical addresses adopted in a file system provided by this embodiment by showing an operation in FIGS. 9A and 9B to update data in the physical data structure of a flash memory.

FIG. 9A is a diagram showing four blocks extracted from a segment in which a physical address is assigned to each of the blocks. As shown in the figure, the physical addresses are incremental in accordance with the physical layout of the blocks in the memory. The relation between a block and a physical address assigned to the block is fixed. The values of the physical addresses assigned to the four blocks shown in FIG. 9A are 105 for the top block and 106, 107, and 108 following in that order. It should be noted that an actual physical address is two bytes in length.

In the example shown in FIG. 9A, the blocks with the physical addresses 105 and 106 are used blocks in which data has already been stored. On the other hand, the blocks with the physical addresses 107 and 108 are unused blocks, or unrecorded areas from which data was erased.

A logical address is an address assigned to data written into a block. A logical address is an address used by the FAT file system.

In the example shown in FIG. 9A, the values of the logical addresses that are assigned to pieces of data in the four blocks are 102 for the data in the top block and 103, 104 and 105 following in that order. It should be noted that an actual logical address is also two bytes in length.

In the example shown in FIG. 9A, the data stored at the physical address 105 is to be updated, that is, the contents of the used block at the physical address 105 are to be rewritten or partially erased.

In such a case, in the file system of the flash memory, the updated data is not rewritten in the same block, that is, block 105, rather, the updated data is written into an unused block. As shown in FIG. 9B, at the processing (1), the data stored at the physical address 105 is erased and then the updated data is written into a block at the physical address 107, which has been an unused block so far.

Then, in processing (2), the relationship between the logical address and the physical address is changed, so that the logical address 102 which had been assigned to the physical address 105 in the state before the data updating process shown in FIG. 9A is reassigned to the physical address 107 assigned to the block in which the updated data was written, as shown in FIG. 9B. With this, the logical address 104 which has been assigned to the physical address 107 before te data updateing process is now reassigned to the physical address 105.

That is to say, a physical address is assigned to a block permanently while a logical address can be regarded as an address associated with data that has the size of a block unit and has been written into a block.

By swapping physical addresses for the logical address as described above, access is not made repeatedly to the same physical address in the storage area (block), making it possible to prolong the life of the flash memory, which is determined by the number of write operations carried out at each physical address.

In swapping logical addresses between blocks by treating logical address in the processing (2) as described above, data is moved from the physical address of a block occupied by the data prior to the data updating process to a new physical address of the block now occupied by the updated data. It appears to the FAT file system, however, that the data remains at the same logical address, thereby allowing subsequent accesses thereto to be made properly and correctly.

It should be noted that, in order to simplify control to update information stored in the logical/physical address control table, the processing to swap logical addresses between blocks is prescribed to swapping logical addresses only between blocks pertaining to the same segment. To put it differently, logical addresses are not swapped among blocks of different segments. A single segment having n blocks is shown in FIG. 7A.

2-4. Logical/Physical Address Control Table of the Embodiment

As seen from the explanation with reference to FIGS. 9A and 9B, the swapping of logical addresses between blocks changes the assignment of a logical address from a physical address to another physical address when the data is updated. A logical/physical address control table is used for storing the information of the assignments of logical addresses to physical addresses. Thus, to implement an access to write or read data to or from the flash memory, the logical/physical address control table is required. The FAT file system refers to the logical/physical address control table in order to identify a physical address associated with the logical address specified in the access request. Access is then made to a block at the identified physical address. Conversely speaking, access by the FAT file system to the flash memory can not be made without the logical/physical address control table.

In the conventional system, when the planar memory 1 is mounted on the main apparatus, a logical/physical address control table is constructed by a microprocessor employed in the main apparatus by checking logical addresses of redundant portions, as shown in FIGS. 7E and 7F, for all pages in the planar memory 1 that have been stored in a RAM also employed in the main apparatus. That is to say, the planar memory 1 does not include the information stored in the logical/physical address control table.

In the case of the above-described embodiment of the present invention, on the contrary, the logical/physical address control table is actually stored in the planar memory 1 as will be described later.

FIG. 10 is a diagram conceptually showing the construction of a logical/physical address control table that can be stored in the planar memory 1 according to the present invention in which the logical addresses put typically in an ascending order are assigned to 2-byte physical addresses, as indicated by information on assignment stored in the constructed logical/physical address control table. It should be noted that, actually the logical and physical addresses are each expressed by two bytes as described before. The number of bits in the two bytes is large enough to cover 8,192 blocks and forming a flash memory with a maximum storage capacity of 128 MB.

Much like the physical addresses, each of the logical addresses shown in FIG. 10 is actually two bytes in length. In addition, the 2-byte logical/physical addresses are each represented in a hexadecimal format. That is to say, a number following the notation '0x' comprises hexadecimal digits. It should be noted that the hexadecimal representation using the notation '0x' is used to express a hexadecimal number in the same way throughout the rest of the description.

Figures 11A, 11B:
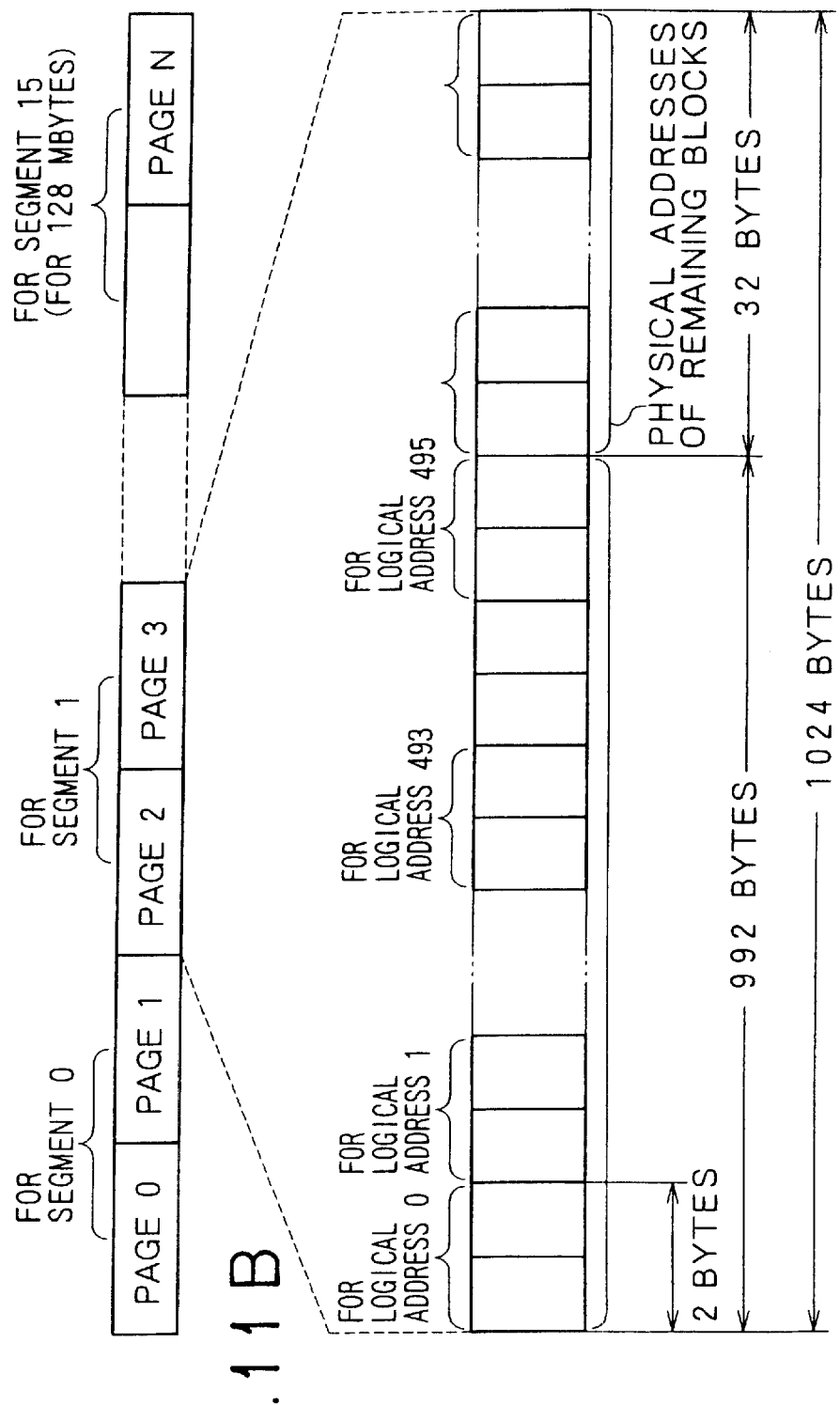
FIG. 11A is a diagram showing the whole data structure of the logical/physical address control table provided by this embodiment.
FIG. 11B is a diagram showing a data structure of one segment of the logical/physical address control table provided by this embodiment.

FIGS. 11A and 11B are diagrams showing a typical structure of the logical/physical address control table based on the concept shown in FIG. 10 as provided by this embodiment. In order to make the description easy to understand, the 16-byte redundant portion shown in FIGS. 7E and 7F is omitted here. The logical/physical address control table provided by this embodiment is stored in a certain block of the flash memory as shown in FIGS. 11A and 11B. It should be noted that a block for storing the logical/physical address control table is prescribed to be always a block in the last segment. As shown in FIG. 11A, the first two pages of the block, namely, pages 0 and 1, are used as an area for storing information of the logical/physical address control table for segment 0. In the case of a flash memory with a storage capacity of 4 MB shown in FIG. 13, only pages 0 and 1 are used as an area for storing information of the logical/physical address control table for the only 1 segment existing in the flash memory.

A flash memory with a storage capacity of 8 MB comprises two segments. In this case, pages 0 and 1 are used as an area for storing information of the logical/physical address control table for segment 0 whereas pages 2 and 3 are used as an area for storing information of the logical/physical address control table for segment 1.

As the storage capacity of the flash memory increases thereafter, the next two pages are used as an area for storing information of the logical/physical address control table for the additional segment of the flash memory.

Finally, a flash memory with the maximum storage capacity of 128 MB comprises sixteen segments. In this case, all the pages are used for storing information of the logical/physical address control table for all the segments including the last segment, that is, segment 15, as shown in FIG. 11A. Thus, in a flash memory with the maximum storage capacity of 128 MB, all thirty-two pages of the block are used. In FIG. 11A, the last page of the block is page N, where N is thirty-one.

As seen from the above explanation, information of the logical/physical address control table is controlled in segment units. FIG. 11B is a diagram showing the structure of 2-page information extracted from the logical/physical address control table for one segment. Since the data area of one page is 512 bytes in size as shown in FIG. 7E, the information shown in FIG. 11B is 1,024 (=512×2) bytes in length.

As shown in FIG. 11B, the 2-page data area comprising 1,024 bytes is delimited into sub-areas each composed of 2 bytes. The sub-areas starting with byte 0 and ending with byte 991 are prescribed as sub-areas permanently allocated to logical address 0, logical address 1, and so on up to logical address 495. Thus, logical address 495 is associated with the last two bytes, namely, byte 990 and byte 991. Each of these 2-byte sub-areas is used for storing a physical address associated with a logical address to which the sub-area is allocated. Thus, logical addresses are swapped between blocks as part of an operation to update actual data, to which one of the logical addresses is assigned as described above, by changing assignments of the logical addresses to physical addresses stored as information in the logical/physical address control table provided by this embodiment. More specifically, the assignments of the logical addresses to physical addresses are changed by swapping the physical addresses in the 2-page data area shown in FIG. 11B between 2-byte sub-areas permanently allocated to the logical addresses.

The remaining 32-byte area in the 2-page data area from byte 992 to byte 1023 is used for storing physical addresses of the remaining sixteen blocks in the segment. Thus, the physical addresses of the remaining sixteen blocks can be controlled. A remaining block serves typically as the so-called work block, which is used for temporarily saving data to be rewritten in an operation to update data in block units.

By the way, in spite of the fact that one segment comprises 512 blocks as described earlier, in the table structure shown in FIGS. 11A and 11B, only 496 blocks are controllable blocks being allocated to logical addresses 0 to 495. This is because the rest is used for storing physical addresses of the remaining blocks described above and, in a flash memory, the existence of some defective blocks treated as unusable blocks is unavoidable. As a matter of fact, the remaining blocks typically includes a fairly large number of defective blocks.

Actually, 496 controllable blocks are sufficient for use as valid blocks in which data can be written or erased.

As described above, the block for storing the logical/physical address control table comprises a number of pages each including a redundant portion for storing a management flag, as shown in FIG. 8. Bit 3 of the management flag is set at 0 to indicate that the block is used for storing the logical/physical address control table.

When the block containing the logical/physical address control table is updated, that is, when the contents of the logical/physical address control table are changed, the processing to swap logical addresses between blocks explained earlier with reference to FIGS. 9A and 9B is carried out without exception. That is to say, the block for storing the logical/physical address control table is not determinate and it is impossible to prescribe a block that is dedicated for storing the logical/physical address control table.

Thus, the FAT file system accesses the flash memory to search for a block with a 0 set in bit 3 of the management flag thereof and recognizes such a block as the block storing the logical/physical address control table. In order to make it easy for the FAT file system to search the flash memory for the block storing the logical/physical address control table, the logical/physical address control table is prescribed in this embodiment to be always stored in a block of the last segment of the flash memory, that is, a segment identified by the last segment number. Accordingly, the FAT file needs to search only the last segment for the block storing the logical/physical address control table. That is to say, it is not necessary for the FAT file to search all segments in the flash memory for the block storing the logical/physical address control table. The logical/physical address control table shown in FIGS. 11A and 11B is stored in a block typically during the manufacturing of the planar memory 1.

The following description is an example with reference to FIGS. 14A, 14B, 14C and 14D in order to help the reader understand better what has been described so far. FIGS. 14A, 14B, 14C and 14D are diagrams showing a flash memory with a storage capacity of 4 MB. As explained with reference to FIG. 13, the 4-MB flash memory includes only one segment comprising 512 blocks each having sixteen pages.

As shown in FIG. 14A, in segment 0, blocks 0 and 1 each serve as a boot block. Since segment 0 is also the last segment, both operand data and instruction data are stored therein. The physical address of block 0 is 0x0000 not associated with any logical address. By the same token, the physical address of block 1 is 0x0001 also not associated with any logical address. Block 2 at physical address 0x0002 is used for storing main data to which a logical address of 0x0001 has been assigned. Likewise, block 3 at physical address 0x0003 is used for storing main data to which a logical address of 0x0000 has been assigned. Similarly, block 4 at physical address 0x0004 is used for storing main data to which a logical address of 0x0004 has been assigned and block 5 at physical address 0x0005 is used for storing operand data to which a logical address of 0x0003 has been assigned. By the same token, block 6 at physical address 0x0006 is used for storing operand data to which a logical address of 0x0002 has been assigned and block 511 at physical address 0x01FF is used for storing operand data to which a logical address of 0x1FD has been assigned. On the other hand, block 123 at a physical address of 0x007B is used for storing instruction data to which a logical address of 0x0005 is assigned.

FIG. 14B is a diagram showing block 2 used for storing operand data and FIG. 14C is a diagram showing block 123 used for storing instruction data. As shown in FIGS. 14B and 14C, there is no difference in configuration between blocks used for storing operand data and blocks used for storing instruction data. The only difference between the two blocks is the value of a control table flag stored in the redundant portion of page 0 in each of the blocks. Looking at the blocks shown in FIGS. 14B and 14C, the value of the control table flag in block 2 shown in FIG. 14B is 1 to indicate that this block is used for storing operand data. On the other hand, the value of the control table flag in block 123 shown in FIG. 14C is 0 to indicate that this block is used for storing instruction data. As shown in FIGS. 14B and 14C, a logical-address field of the redundant portion in a block is used for storing a logical address assigned to data stored in the block.

In order to simplify the drawings, the logical address in the redundant portion shown in FIG. 14B, the logical address in the redundant portion shown in FIG. 14C, and physical addresses in the logical/physical address control table shown in FIG. 14D are each expressed in the hexadecimal format omitting the code 0x. Not specially used, hatched portions in the redundant portions in the blocks shown in FIGS. 14B and 14C each have indeterminate contents.

As described above, the block shown in FIG. 14C is used for storing control data for a flash memory of 4 MB. As shown in FIG. 14C, only two pages of the block are required for storing control data representing relations between logical addresses and physical addresses for segment 0 of the 4-MB flash memory including the extra blocks. The remaining pages of the block are not used. The data structure of the logical/physical address control table stored in these two pages is shown in FIG. 14D. Two pages are required for storing control data representing relations between logical addresses and physical addresses for one segment. In the case of a flash memory comprising more segments, more pages in the block are used, even though there are always unused pages in the block, as shown in FIG. 14C, except for a flash memory with a storage capacity of 128 MB, such as shown in FIG. 13.

FIG. 14D is a diagram showing the logical/physical address control table containing control data stored in pages 0 and 1 of the block shown in FIG. 14C. It should be noted that the logical address 0x0000 is abbreviated simply to logical address 0 in order to simplify FIG. 14D and this abbreviation is applied to the other logical addresses shown in FIG. 14D. FIG. 14D does not show explicitly which of the two bytes is used for storing the high-order byte of the physical address and which of the two bytes is used for storing the low-order byte of the physical address.

Physically, a flash memory with a storage capacity of 4 MB comprises 512 blocks as shown in FIG. 13. Since there are defective blocks in the flash memory, only a maximum of 493 blocks excluding the two boot blocks are allocated to logical addresses, as shown in FIG. 14D.

As shown in FIG. 14A, the logical address 0x0000 is assigned to data stored in a block at the physical address 0*0003. In this case, the physical address 0*0003 is stored in 2 bytes in the logical/physical address control table of FIG. 14D which are allocated to the logical address 0. By the same token, the physical address 0x0002 is stored in the logical/physical address control table which are allocated to the logical address 1 and the physical address 0x0006 is stored in the logical/physical address control table allocated to the logical address 2. Similarly, the physical address 0x0005 is stored in the logical/physical address control table allocated to the logical address 3, and the physical address 0x0004 is stored in the logical/physical address control table allocated to the logical address 4. Likewise, the physical address 0x007b is stored in the logical/physical address control table allocated to the logical address 5, and the physical address 0x01FF is stored in the logical/physical address control table allocated to the logical address 493.

In accessing data in the planar memory 1, the file system converts a logical address specified in the access into a physical address of a block containing the desired data by using the logical/physical address control table. Assume, for example, that an application program issues an instruction to read out data sequentially from logical addresses 0x0002, 0x0003 and 0x0004 to the file system. In this case, the file system processes the instruction in accordance with the following procedure.

First of all, the planar memory 1 shown in FIG. 14A is searched for a block with a 0 control table flag in the redundant portion of page 0 thereof. As a result of the search, block 123 storing the logical/physical address control table is found. In this case, since the logical addresses 0x0002, 0x0003 and 0x0004 are obviously associated with the first part of the logical/physical address control table and since the size of an embedded RAM for temporarily storing instruction data of the logical/physical address control table is small, only instruction data in page 0 of block 123 is read out. Then, by using the control data, the logical addresses 0x0002, 0x0003 and 0x0004 are converted into the physical addresses 0x0006, 0x0005 and 0x0004, respectively. Finally, the file system reads out the pieces of data sequentially from the blocks at the physical addresses 0x0006, 0x0005 and 0x0004 as requested by the instruction issued by the application program.

Relations between the storage capacity of a flash memory and the size of a logical/physical address control table are explained with reference to FIG. 13.

As has been explained earlier with reference to FIGS. 11A and 11B, the amount of information stored in the logical/physical address control table for controlling one segment is 1,024 bytes (or 1 KB) corresponding to two pages. Thus, for controlling a flash memory of one segment with a storage capacity of 4 MB, as shown in FIG. 13, the size of the logical/physical address control table is 1 KB. For controlling a flash memory of two segments with a storage capacity of 8 MB, the logical/physical address control table occupies an area of 2 KB corresponding to four pages.

For controlling a flash memory of 4 segments (=2,048 blocks) with a storage capacity of 16 MB, the logical/physical address control table occupies an area of 4 KB corresponding to eight pages. For controlling a flash memory of two segments (=1,024 blocks) with a storage capacity of 16 MB, the logical/physical address control table occupies an area of 2 KB corresponding to four pages.

For controlling a flash memory of four segments with a storage capacity of 32 MB, the logical/physical address control table occupies an area of 4 KB corresponding to eight pages. For controlling a flash memory of eight segments with a storage capacity of 64 MB, the logical/physical address control table occupies an area of 8 KB corresponding to sixteen pages. For controlling a flash memory of sixteen segments with a storage capacity of 128 MB, the logical/physical address control table occupies an area of 16 KB corresponding to thirty-two pages.

Incidentally, in the logical/physical address control table of a file system with the conventional configuration for a flash memory, a virtually indeterminate balue is used as a physical address associated with an unused logical address.

Figure 12A:
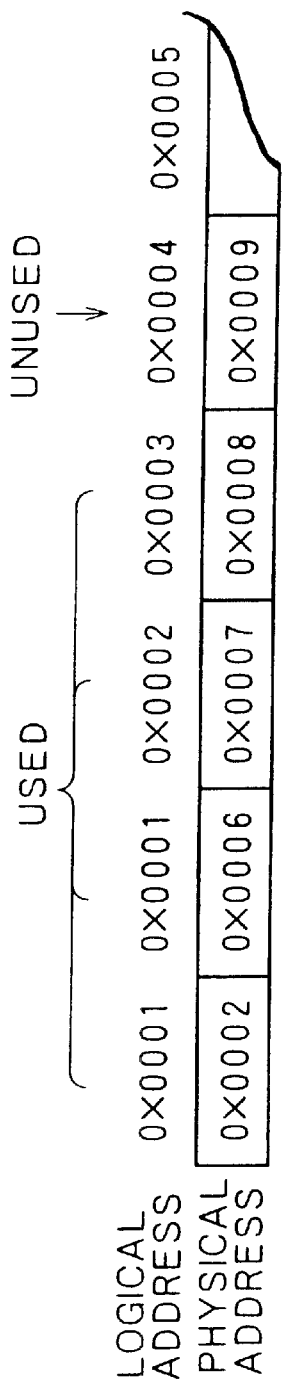
FIG. 12A is an explanatory diagram used for describing management of unused blocks by using the logical/physical address control table provided by the embodiment.
Figure 12B:
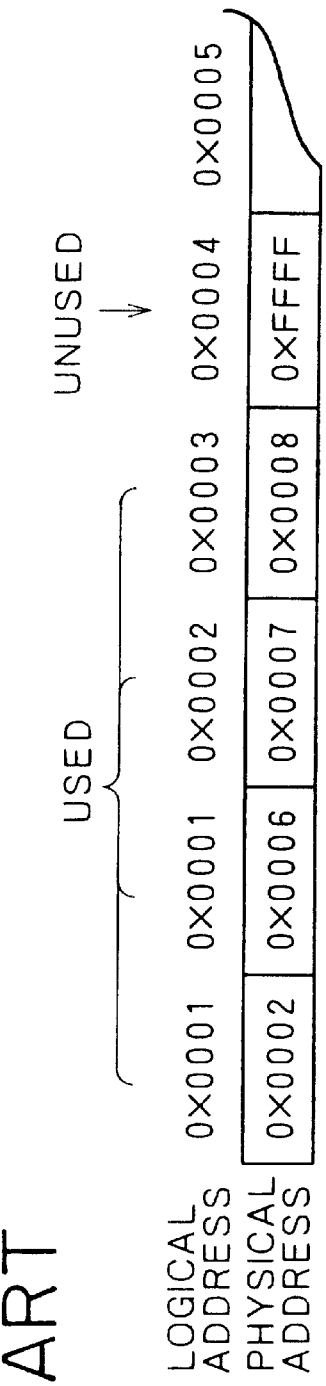
FIG. 12B is an explanatory diagram used for describing management of unused blocks by using the logical/physical address control table in the conventional system.

More specifically, taking a logical/physical address control table, such as shown in FIG. 12B as an example, logical addresses 0x0000, 0x0000, 0x0002 and 0x0003 are already used and assigned to physical addresses 0x0002, 0x0006, 0x0007 and 0x0008, respectively. That is to say, the physical addresses 0x0002, 0x0006, 0x0007 and 0x0008 where pieces of data have already been stored are associated with the logical addresses 0x0000, 0x0001, 0x0002 and 0x0003, respectively. On the other hand, if a logical address of 0x0004 is not used, an invalid value of 0xFFFF is used as a physical address associated with the unused logical address 0x0004. The invalid value 0xFFFF set as a physical address indicates that the storage area at this physical address is not used.

Thus, in an attempt to write new data in the unused storage area allocated to the logical address 0x0004 by referring to the logical/physical address control table shown in FIG. 12B, the FAT file system typically searches for a physically unused block at a hierarchical level different from the logical/physical address control table before executing an operation to write the data into the block found in the search. Then, the contents of the logical/physical address control table are updated by cataloging the physical address of the block, in which the data was newly written, into the logical/physical address control table at a table entry associated with the logical address 0x0004.

A problem arises, however, in such an implementation of the logical/physical address control table. Assume that data handled by the main apparatus is the so-called real-time data observed along the time axis such as motion-picture data or audio data of a piece of music or the like. In the main apparatus, the input data observed along the time axis is subjected to signal processing carried out in a real-time manner before being recorded in the planar memory 1 as recording data. If the implementation of the logical/physical address control table explained earlier with reference to FIG. 12B is adopted, recording the data into the planar memory 1, the planar memory 1 needs to be searched for an unused block, as described above. In recording data observed along the real time axis, such as the one described above, it is necessary to write the input data into the planar memory 1 at such an average speed that no data overflow occurs. The search carried out at that time for an unused block presents extremely difficult processing for the microprocessor 109.

That is to say, in the present state of the art it is very difficult to record real-time data into the planar memory 1. Practically, such data is merely recorded into a still-picture file or a text file which imposes no real-time requirements.

In order to solve the problem described above, in the logical/physical address control table provided by this embodiment, the physical address of a block representing an unused area is associated with an unused logical address. An example of the logical/physical address control table provided by this embodiment is shown in FIG. 12A.

In this example, logical addresses 0x000, 0x0001, 0x0002 and 0x0003 are already used and assigned to physical addresses 0x0002, 0x0006, 0x0007 and 0x0008, respectively. That is to say, the physical addresses 0x0002, 0x0006, 0x0007 and 0x0008 at which pieces of data have already been stored are associated with the logical addresses 0x0000, 0x0001, 0x0002 and 0x0003, respectively, as is the case with the example shown in FIG. 12B. In addition, the logical address 0x0004 is not used, as is also the case with the example shown in FIG. 12B.

As shown in FIG. 12A, in this embodiment, however, a physical address of 0x0009 of a typical unused block replacing the invalid physical address 0xFFFF is associated with the unused logical address 0x0004. In this example, only one unused block allocated to one unused logical address is shown, however, other unused blocks can be allocated to other unused logical addresses and the physical addresses of the other unused blocks are associated with the other unused logical addresses in the same way as the physical address 0x0009 is associated with the logical address 0x0004.

In a logical/physical address control table constructed in this way, a physical address associated with a logical address can be interpreted as a free area allocated to the logical address.

Thus, the FAT file system is capable of determining a physical address of an unused block allocated to a logical address in advance with reference to the logical/physical address control table in a recording operation, and it is no longer necessary to execute processing to search for an unused block, as is the case with the implementation of the logical/physical address control table shown in FIG. 12B. That is, with reference to the logical/physical address control table, it is possible to obtain a physical address associated with a logical address assigned to a free area by the FAT file system. Then, data is written into an unused block at the physical address by accessing to the block. As a result, the processing load borne by the microprocessor employed in the main apparatus is reduced substantially, and, for example,] the operation to record data observed along the real-time axis as described above can be carried out with ease. Also recording data requiring no real-time processing such as text-file data and still-picture data, the time it takes to write the data into the flash memory can of course be shortened by adopting the file system provided by the embodiment as shown in FIG. 12A in comparison with the conventional system.

A procedure of recording data executed by a recording/playback apparatus implemented by the above-described embodiment is explained with reference to a flowchart shown in FIG. 15.

Figure 15:
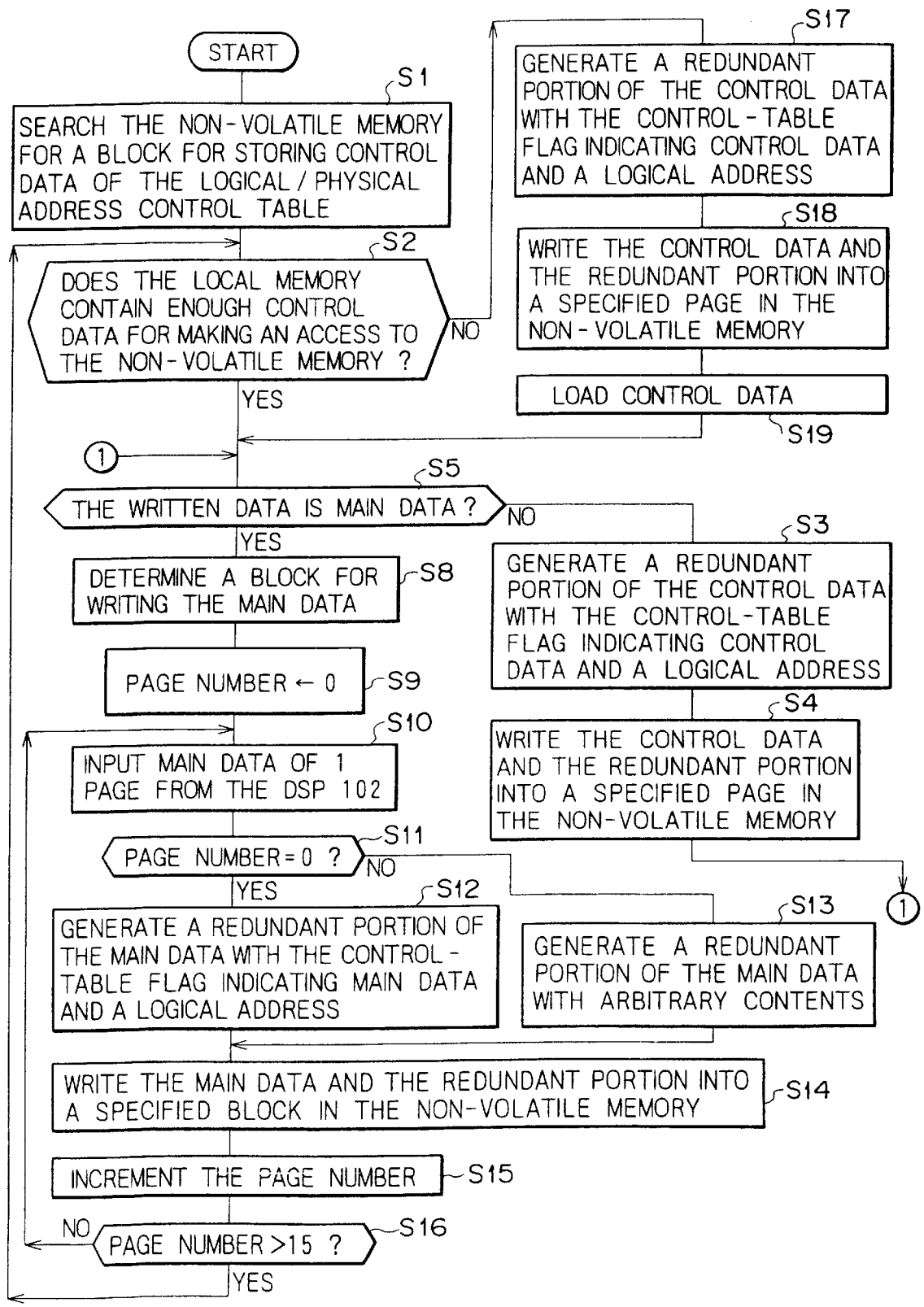
FIG. 15 shows a flowchart representing a recording method adopted in a recording apparatus implemented by the embodiment.

As shown in FIG. 15, the flowchart begins with a step S1 at which the non-volatile memory implemented as the planar memory 1 that is to undergo a recording operation is searched for a block used as a control-data area for storing control data of the logical/physical address control table before the recording operation is started. Actually, as explained above only the last segment of the non-volatile memory containing the logical/physical address control table is searched for a block with a 0 control table flag in the redundant portion of the first page or page 0 thereof, as shown in FIG. 14C.

The flow of the procedure then goes on to a step S2 to make a judgment as to whether the local memory of the recording/playback apparatus already contains some of the control data of the logical/physical address control table of an amount sufficient to access the non-volatile memory. If the outcome of the judgment indicates that the local memory already contains some of the control data of the logical/physical address control table of an amount large enough for accessing the non-volatile memory, the flow of the processing goes on to a step S5. If the outcome of the judgment made at the step S2 indicates that the local memory does not contain control data of the logical/physical address control table sufficient for accessing the non-volatile memory, the flow of the processing goes on to a step S17. At the steps S17, S18 and S19, part of the instruction data currently stored in the local memory is swapped with other instruction data. At the step S17, a redundant portion of the instruction data currently stored in the local memory is generated with the control table flag to indicate that the data to be written is instruction data of the logical/physical address instruction table. The instruction data is a part of the logical/physical address control table. A logical address assigned in advance to the logical/physical address control table is also, recorded into the redundant portion.

At the step S18, the instruction data of the logical/physical address control table currently stored in the local memory and the redundant portion generated at the step S17 are written into the non-volatile memory at the logical address. As described earlier, the logical address is converted by the file system, using the logical/physical address control table, into a physical address in the non-volatile memory, at which physical address, the instruction data, and the redundant portion are actually stored.

At the step S19, some instruction data of the logical/physical address control table required for accessing to the non-volatile memory as judged at the step S2 is transferred from the non-volatile memory to the local memory. After the processing of the step S19 is completed, the flow of the procedure proceeds to the step S5.

At the step S5, an attribute of the data to be written into the non-volatile memory is examined to make a judgment as to whether the data is instruction data or operand data. If the outcome of the judgment indicates operand data, the flow of the procedure goes on to a step S8. If the outcome of the judgment indicates instruction data, the flow of the procedure goes on to a step S3.

At the step S3, a redundant portion of the instruction data recognized at the step S5 is generated with the control table flag of the redundant portion to indicate that the data to be written is instruction data of the logical/physical address control table. The instruction data is a part of the logical/physical address control table. A logical address assigned in advance to the logical/physical address control table is also recorded into the redundant portion.

The flow of the procedure then goes on to a step S4 at which the instruction data recognized at the step S5 and the redundant portion generated at the step S3 are written into the non-volatile memory at the logical address. As described earlier, the logical address is converted by the file system, using the logical/physical address control table, into a physical address in the non-volatile memory, at which physical address the instruction data and the redundant portion are actually stored.

At the step S8, a next block into which the operand data is to be written is determined by using part of the logical/physical address control table currently stored in the local memory. The flow of the procedure then goes on to a step S9 at which the number of a page into which the operand data is to be written is initialized at 0.

The flow of the procedure then goes on to a step S10 at which operand data of one page is input from the DSP 102.

At a step S11 a judgment is made as to whether the number of a page into which the operand data is to be written is 0. If the page number is 0, the flow of the procedure goes on to a step S12. If the page number is not 0, the flow of the procedure goes on to a step S13. In this embodiment, a non-zero flag number has a value in the range one to fifteen.

At the step S12, a redundant portion of the operand data that was recognized is generated with the control table flag of the redundant portion set at 1 to indicate that the data to be written is operand data. A logical address assigned in advance to the logical/physical address control table is also recorded into the redundant portion.

The step S13 is similar to the step S12 except that the contents of a created redundant portion are arbitrary. The contents may be the values set at the step S12.

After the processing of the step S12 or S13 is completed, the flow of the procedure goes on to a step S14 at which the redundant portion generated at the step [S1-2 jor] S12 or S13 and the 1-page operand data obtained at the step S10 are written into a page of the block in the non-volatile memory. The block was determined at the step S8 and the page is indicated by a page number which was initialized at the step S9.

The flow of the procedure then goes on to the step S15 at which the page number is incremented.

The flow of the procedure then goes on to a step S16 to make a judgement as to whether or not the page number incremented at the step S15 has reached the maximum number of pages per block in the non-volatile memory. In this embodiment, the number of pages per block in the non-volatile memory is sixteen. Thus, a page number equal to sixteen indicates that the operation of writing data into a block unit has been completed. In this case, the flow of the procedure goes back to the step S2. If the page number is found less than sixteen at the step S16, the flow of the procedure goes back to the step S10.

By carrying out the operations described above, the recording/playback apparatus is capable of recording operand data into the planar memory 1.

Figure 16:
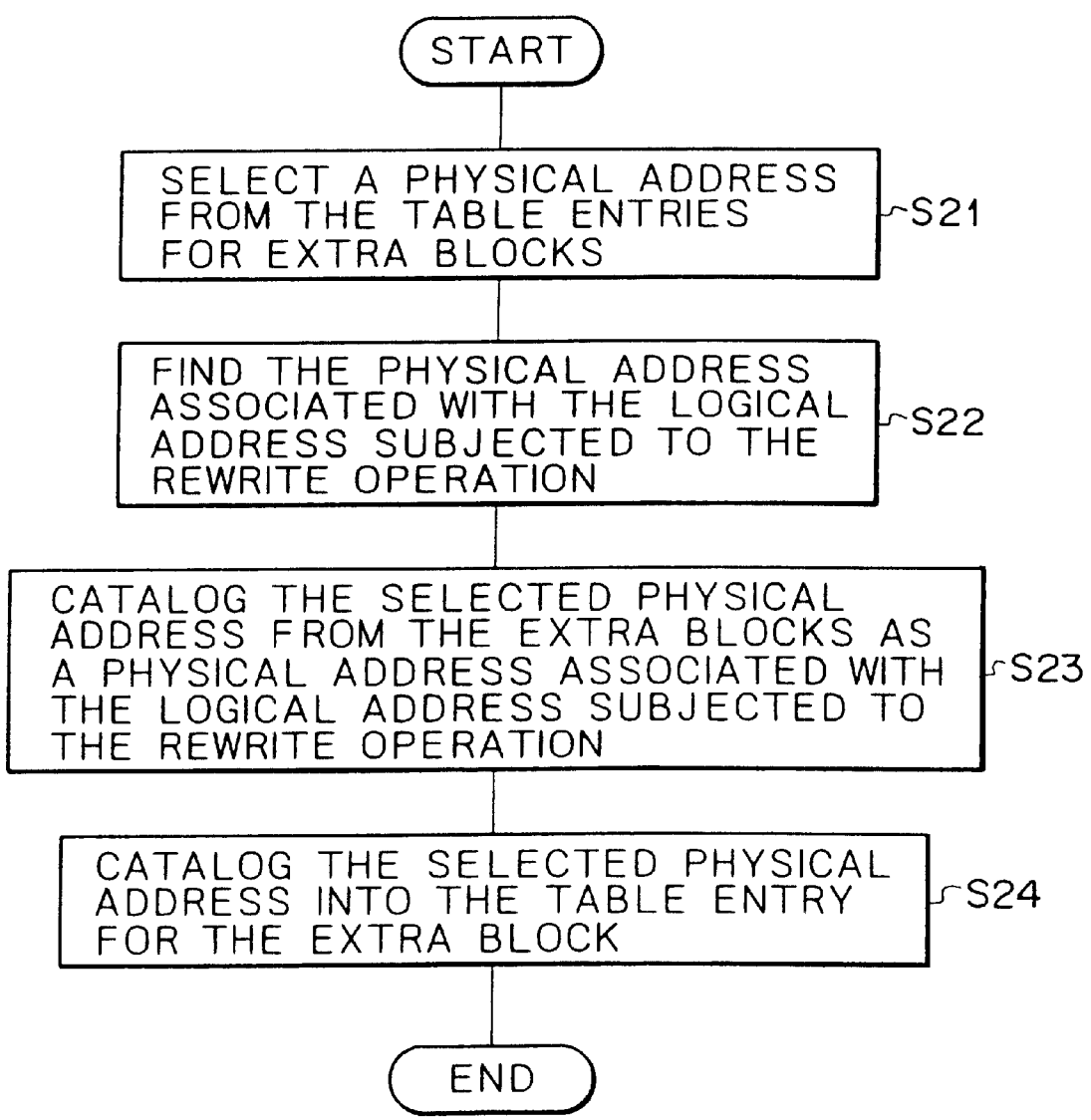
FIG. 16 shows a flowchart representing a method of determining a block to be used in an operation to rewrite data and related processing carried out on the logical/physical address control table in the recording apparatus implemented by the embodiment.
Figure 17:
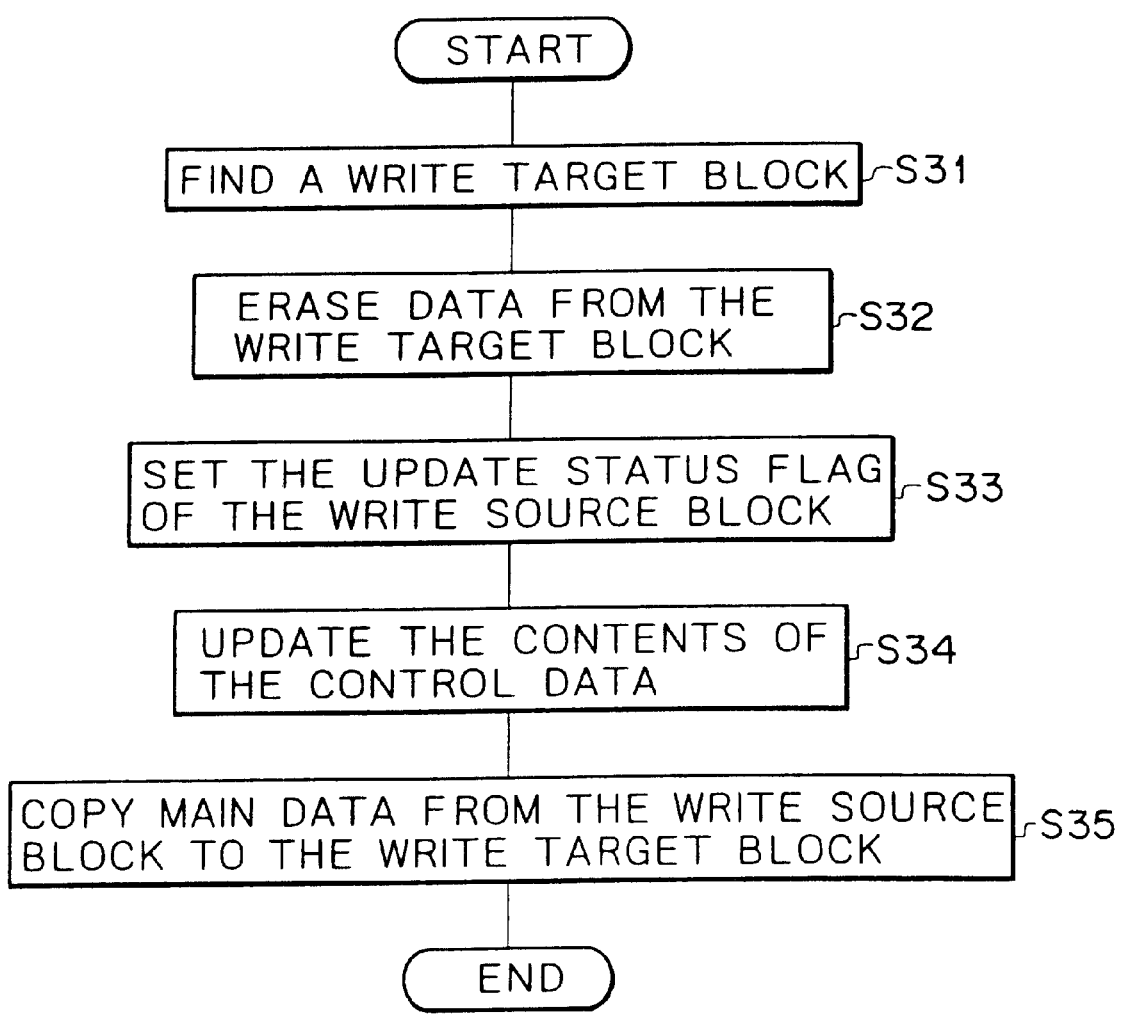
FIG. 17 shows a flowchart representing a method of rewriting operand data in the recording apparatus-implemented by the embodiment.

The following description explains an operation to rewrite operand data or instruction data with reference to FIGS. 16, 17 and 18. In the following description, the operand data and the control data are referred to simply as data.

In this embodiment employing the planar memory 1 implemented by a non-volatile flash memory, data is rewritten in block units. This is because, unlike an operation to write new data, in a flash memory, data is always rewritten into a different block from which data has been previously erased. As a characteristic of a flash memory, the smallest physical storage units of erased data, which are each called a cell, are all set to "1". Thus, the smallest physical storage unit can be regarded as a bit of logic data. In an operation to write data into a flash memory, 0's are written only into cells corresponding to 0 bits of the data. To be more specific, such cells are each put into a state of electrically 0. Once a cell has been put into a state of electrically 0, the cell can not be restored to a state of electrically 1 even if a bit having a value of 1 is written into the cell. Such a cell can be restored to a state of electrically 1 only in a block erase operation. That is why updated data can not be stored correctly unless the data is written into an erased area with all cells or bits thereof restored to the initial value of 1. Also as described earlier, [in this embodiment,] updated data is not rewritten into the same area in order to prolong the life of the flash memory, which may otherwise be shortened by repeated operations to write data in the same area. Instead, updated data is rewritten into a new block that is currently unused. That is to say, in a rewrite operation, the updated data is moved or copied to the unused block from the block presently occupied by the data.

As described before, the logical/physical address control table has a configuration wherein each logical address is assigned permanently to a table entry and a dynamically variable physical address associated with the logical address is stored in the table entry. In an operation to rewrite data into an unused block, it is necessary to know the physical address of the unused block. As shown in FIG. 11B, a portion of the logical/physical address control table for segment 1 comprises 2-byte table entries 0 to 495, allocated permanently to logical addresses of 0 to 495 respectively. A physical address associated with a logical address assigned to a table entry is recorded in the table entry. Table entries after the table entry 495 are used for storing the physical address of an extra block. The head of the table entries for storing physical addresses of extra blocks is determined by a segment number.

FIG. 16 shows a flowchart representing a method of determining a block to be used in an operation to rewrite data as a write target block and related processing carried out on the logical/physical address control table.

As shown in the figure, the flowchart begins with a step S21 at which a physical address is selected arbitrarily from the table entries for extra blocks shown in FIG. 11B as the physical address of a write target block. A write target block is a block into which data is intended to be written.

At a step S22, the physical address associated with the logical block assigned to a block subjected to the rewrite operation is found from the logical/physical address control table shown in FIG. 11B. It should be noted that data will be actually written into a write target block instead of the block being subjected to the rewrite operation. At a step S23, the physical address of the write target block selected at the step S21 is cataloged into a table entry from which the physical address of the block subjected to the rewrite operation was found at the step S22. At a step S24, the physical address of the block subjected to the rewrite operation found at the step S22 is cataloged into a table entry for an extra block from which the physical address of the write target block was found at the step S21.

Next, a procedure for rewriting main data is explained with reference to a flowchart shown in FIG. 17. As shown in the figure, the flowchart begins with a step S31 at which a write target block is found in the same way as the step S21 of the flowchart shown in FIG. 16. At a step S32, data is erased from the write target block. Data needs to be erased from the write target block for the reason already described earlier.

At a step S33, an update status flag of the write source block shown in FIG. 7F is set. The write source block is the block presently being subjected to the rewrite operation. The processing of the step S33 is carried out to cope with an accident such as a power-supply failure. In the event of a power-supply failure, even if there are blocks which have the same logical address in the same segment, with the update status flag set, the write source block can be identified with ease. Once the write source block is identified, it will be easy to determine once again the write target block.

At a step S34, the contents of the logical/physical address control table are updated in the same way as the steps S22, S23, and S24 of the flowchart shown in FIG. 16. In this way, the physical address of the write target block is cataloged at a table entry of the logical/physical address control table as a physical address associated with a logical address assigned to the table entry.

At a step S35, the original data is updated by copying the updated data into the write target block.

Next, a procedure for rewriting the control data itself, that is, the logical/physical control table, is explained with reference to a flowchart shown in FIG. 18. As shown in the figure, the flowchart begins with a step S41 at which a srite target block is found in the same way as the step S21 of the flowchart shown in FIG. 16. At a step S42, data is erased from the write target block. Data needs to be erased from the write target block for the reason already described earlier.

At a step S43, an update status flag of the write source block shown in FIG. 7F is set. The processing of the step S43 is carried out to cope with an accident such as a power-supply failure. In the event of a power-supply failure, even if there are blocks which have same logical address in the same segment, with the update status flag set, the write source block can be identified with ease. Once the write source block is identified, it will be easy to determine once again the write target block.

At a step S44, the control table flag in the redundant portion of page 0 of the write target block is reset to 0 to indicate that this write target block is a block for storing the logical/physical address control table. As described earlier, a flash memory is characterized in that, once a cell of the flash memory is reset to 0, it can not be restored to 1 unless data in the block including the cell is deleted by a block erasure. In this way, this write target block is recognized as a block for storing the logical/physical address control table until the table is erased from the block.

At a step S45, the contents of the logical/physical address control table are updated in the same way as the steps S22, S23 and S24 of the flowchart shown in FIG. 16. In this way, the physical address of the write target block is cataloged in a table entry in the logical/physical address control table as a physical address associated with a logical address assigned to the table entry. At a step S46, the original data is updated while the updated data is being rewritten into the write target block.

3. System Configuration

Figure 3:
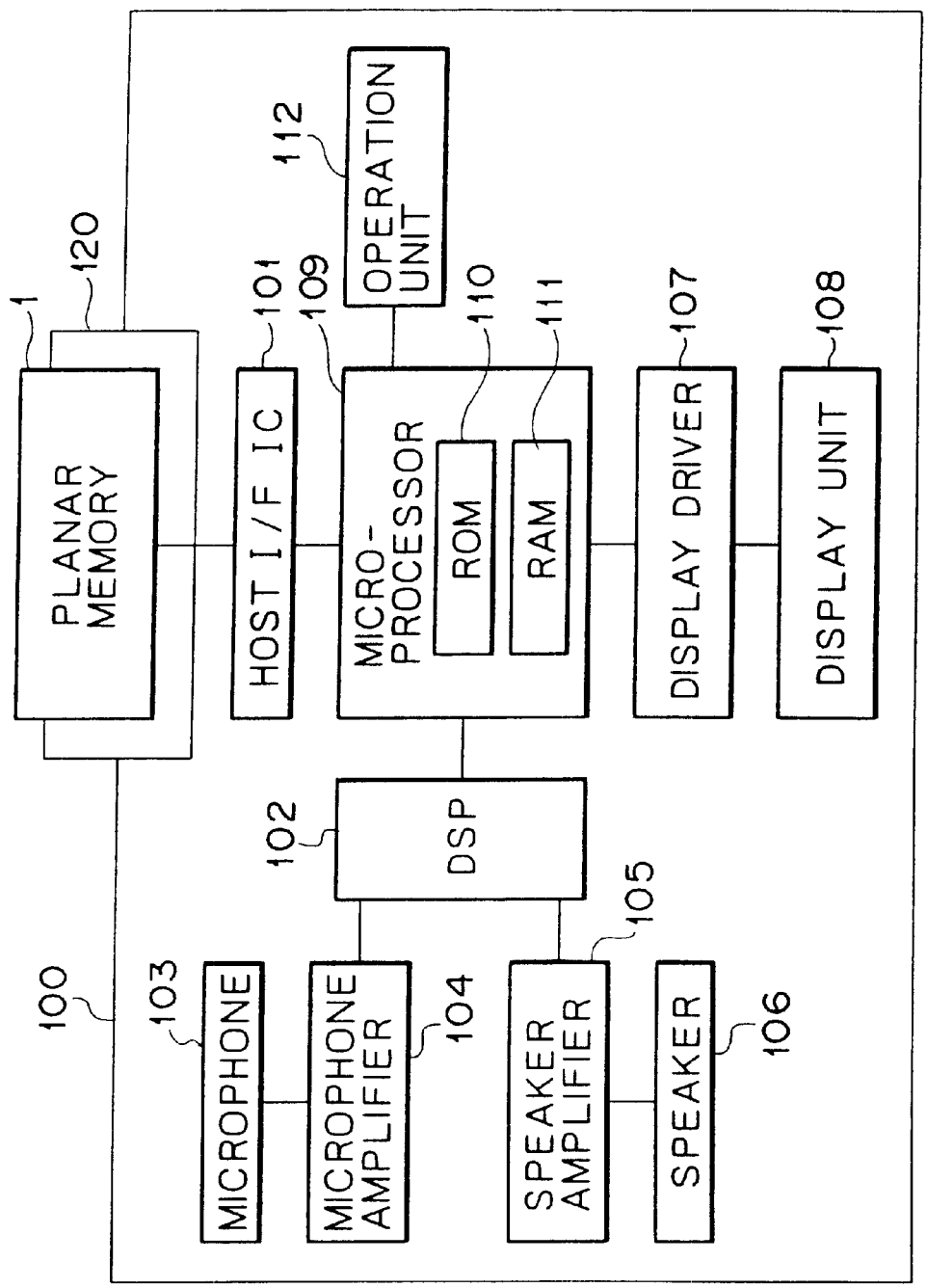
FIG. 3 is a block diagram showing the configuration of a system comprising a main apparatus and the planar memory according to an embodiment of the present invention.

FIG. 3 is a block diagram showing the configuration of a main apparatus which is capable of writing and reading out data into and from the planar memory 1 provided by the embodiment of the present invention explained above. The main apparatus 100, as shown in FIG. 3, and the planar memory 1 constitute an electronic equipment system implemented by the embodiment. In this case, the main apparatus 100 is capable of writing and reading out audio data to and from the planar memory 1.

The configuration of the main apparatus 100 includes a case mounting/dismounting mechanism 120 for mounting and dismounting the planar memory 1 to and from the main apparatus 100. Data is exchanged between the planar memory 1 mounted on the case mounting/dismounting mechanism 120 and the microprocessor 109 through a host interface IC 101.

In addition, the main apparatus 100 also has a microphone 103 for inputting an audio signal representing voice or sound. The analog audio signal is then supplied to a DSP (Digital Signal Processor) 102 by way of a microphone amplifier 104. In the DSP 102, the input analog audio signal is converted into digital audio data and subjected to signal processing, such as encoding, before being supplied to the microprocessor 109 as recording data. The microprocessor 109 is capable of carrying out processing to record the recording data into the planar memory 1 by way of the host interface IC 101. In addition, the microprocessor 109 reads out audio data recorded in the planar memory 1 through the host interface IC 101 and supplies the data to the DSP 102.

In the DSP 102, the data received from the microprocessor 109 is subjected to signal processing, such as demodulation. The DSP 102 finally supplies an analog audio signal obtained as a result of the processing to a speaker amplifier 105. The speaker amplifier 105 amplifies the analog audio signal received from the DSP 102 and supplies an amplified signal to a speaker 106. In this way, a playback audio signal is output.

By controlling a display driver 107, the microprocessor 109 is capable of displaying a desired picture on a display unit 108. Assuming that picture data representing a motion picture or a still picture has been stored in the planar memory 1, the microprocessor is capable of displaying the picture data read out from the planar memory 1 on the display unit 108.

An operation unit 112 is provided with keys to be used by the user to carry out operations for the main apparatus 100. The microprocessor 109 receives a command entered by the user by operating the operation unit 112 and executes necessary control processing in accordance with the command.

It should be noted that the configuration of the main apparatus 100 as shown in FIG. 3 is only an example, and the main apparatus 100 is not limited to the configuration shown in the figure. In other words, the main apparatus 100 can be implemented as an electronic apparatus of any type as long as the electronic apparatus is capable of exchanging data with the planar memory 1 provided by the embodiment.

In order to implement operations to record and play back (or write and read out) data to and from the aforementioned planar memory 1 by means of the main apparatus 100 with a configuration shown in FIG. 3, the logical/physical address control table must be referred to by the FAT file system as described above.

Figure 4:
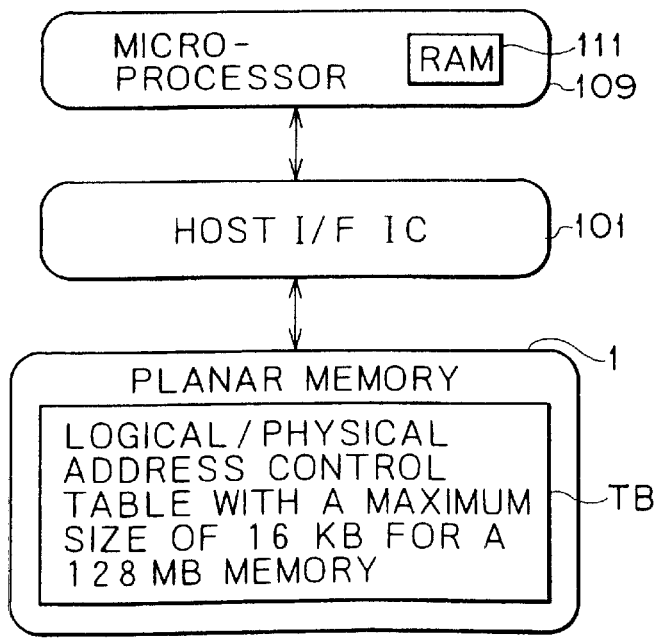
FIG. 4 is an explanatory diagram conceptually showing an interface between a microprocessor employed in the main apparatus and the planar memory in the embodiment.

FIG. 4 is an explanatory diagram conceptually showing an interface between the microprocessor 109 employed in the main apparatus 100 based on the configuration shown in FIG. 3 and the logical/physical address control table stored in the planar memory 1.

For example, when the planar memory 1 is mounted on the main apparatus 100, the microprocessor 109 reads out necessary data in the logical/physical address control table TB from the planar memory 1 through the host interface 1C 101 and stores the data into an internal RAM 111.

The configuration of the conventional system is shown in FIG. 1, as compared with the system provided by the present invention shown in FIG. 3. In the conventional system, the logical/physical address control table is not stored in the planar memory 1A as is the case with the configuration shown in FIG. 1. It should be noted that components of the configuration shown in FIG. 1 that are identical with those shown in FIG. 3 are denoted by the same reference numerals as the latter and their explanation is not repeated.

The system configuration shown in FIG. 1 is different from that shown in FIG. 3 in that, in the case of the former, an external RAM 113 is provided in the main apparatus 10A. The RAM 113 is connected to the microprocessor 109.

Figure 2:
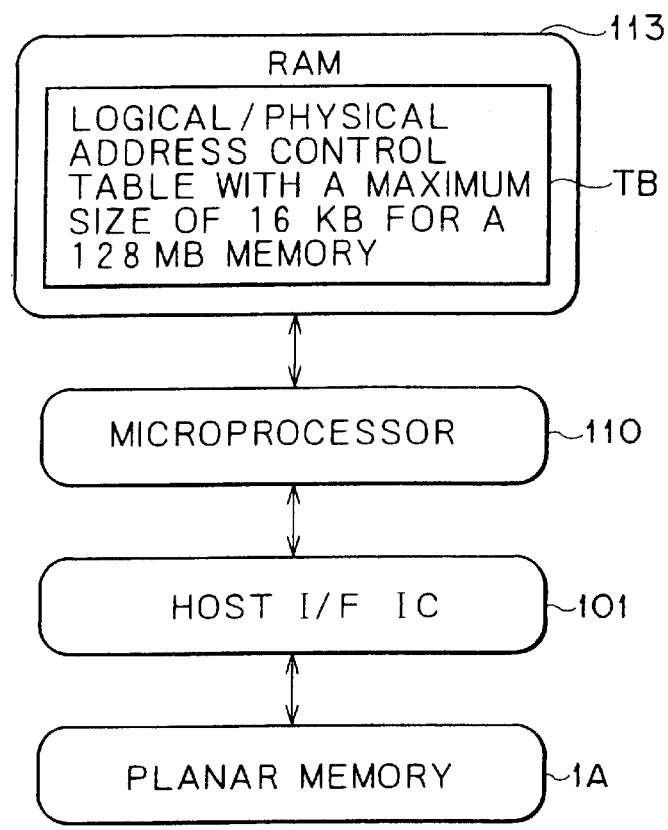
FIG. 2 is an explanatory diagram conceptually showing an interface between a microprocessor employed in the main apparatus and the planar memory in the conventional system.

For the purpose of comparison with the interface shown in FIG. 4, FIG. 2 shows an interface between the microprocessor 109 employed in the main apparatus 100A and the planar memory 1A in the conventional system configuration shown in FIG. 1.

The RAM 113 is used for storing the logical/physical address control table. When the planar memory 1A with no logical/physical address control table stored therein is mounted, the microprocessor 109 accesses to the planar memory 1A by way of the host interface 1C101 to check data contents of the memory 1A in order to execute processing to construct a logical/physical address control table. The logical/physical address control table TB constructed in this way is then stored in the RAM 113.

Typically, the RAM 111 embedded in the microprocessor 109 has a storage capacity of about several tens of KB at the most. It is thus absolutely impossible to store a logical/physical address control table with a size up to 16 KB in the RAM 111 since the existence of a logical/physical address control table in the RAM 111 will provide a hindrance to other processing.

Some microprocessors 109 even have a RAM 111 with a size smaller than the size of the logical/physical address control table. That is, in the case of a configuration wherein a logical/physical address control table is constructed and saved in the main apparatus, it is not realistic to store the logical/physical address control table in the RAM 111. That is why the external RAM 113 is required.

On the other hand, the embodiment of the present invention adopts a configuration wherein the logical/physical address control table is stored in the planar memory 1. In this case, only some necessary data of the logical/physical address control table is read out from the planar memory 1 and stored in the embedded RAM 111 as is explained earlier with reference to FIG. 4. For example, the microprocessor 109 needs only data of the logical/physical address control table for one segment that occupies an area of 1,024 bytes in the logical/physical address control table as shown in FIG. 11. The size of such data will hardly have an impact on the RAM 111 that causes some problems.

For this reason, the external RAM 113 can be eliminated, as shown in FIG. 3. As a result, the cost of the main apparatus 100 can be reduced and the power consumption can also be decreased by the amount of power required to drive the external RAM 113.

In addition, in the case of the embodiment described above, the microprocessor 109 employed in the main apparatus 100 is relieved from the processing needed to construct a logical/physical address control table. Thus, there is no longer a waiting time while the processor constructs a logical/physical address control table. As a result, for example, the embodiment manages to shorten the time it takes to carry out build-up processing of the file system in the planar memory 1, as compared with the conventional system.

Furthermore, in the logical/physical address control table provided by the embodiment, the physical address of each unused block is associated with an unused logical address, as described earlier with reference to FIGS. 12A and 12B. Thus, an access to an unused block can be made through the FAT file system using a simple processing and in a short period of time, as compared with the conventional system. This fast processing is particularly effective for a configuration, such as shown FIG. 3, adopted by the main apparatus 100 for recording data requiring real-time processing, such as audio data.

It should be noted that the present invention is not limited to the embodiment described above. If necessary, changes and modifications can be made to the embodiment. For example, the storage device provided by the present invention is not limited to the external shape shown in FIGS. 5A, 5B, 5C and 5D. The storage device can be designed into any other external shape. In addition, for example, detailed prescriptions of the format of the file system described above can also be changed in accordance with actual applications. Moreover, variations of the storage capacity of the flash memory are not limited to the data shown in FIG. 13.

As described above, the logical/physical address control table is stored in the storage device. Thus, it is not necessary to carry out processing to construct a logical/physical address control table. As a result, at least, the time it takes to complete the build-up process of the file system can be shortened. More specifically, while the user normally has to wait for the main apparatus to enter a state of being capable of writing and reading data to and from the storage device after the storage device is mounted on the main apparatus, the time to wait for such a state can be shortened in the case of the embodiment. As a result, the user is allowed to use the electronic equipment system more in a way the user likes.

In addition, with such a configuration the main apparatus merely needs to read out only some necessary data of the logical/physical address control table from the storage device and store the data typically in a storage area of the RAM embedded in the microprocessor employed in the main apparatus wherein the table occupies only a small area of the embedded RAM so that the operation to obtain the necessary data provides almost no additional load to the microprocessor.

Thus, since it is not necessary to provide the main apparatus with an external RAM including a storage area allocated to all data of the logical/physical address control table, the cost of the main apparatus can be reduced accordingly. In addition, the power consumption can also be decreased by the amount of power required to drive the external RAM.

In the present invention, data is written into a page that is one of the storage units of the flash memory in a uniform format without regard to the type of data. Each page always contains data recorded therein and a redundant portion showing attributes of the data as a pair. A plurality of adjacent pages constitute a block. Pieces of data stored in pages constituting a block have the same attributes. Thus, by checking only the redundant portion for storing data attributes in page 0, which is the first page of a block, it is possible to know the attributes of all pieces of data in the block. In addition, since the data format is uniform regardless of the data attributes, it is not necessary to provide a means and a method for generating a page for each data attribute. Moreover, also with regard to generation of a redundant portion to be stored in a page, it is not necessary to provide a means and a method for generating a redundant portion for each data attribute forming a pair with data, since the format of the redundant portion is uniform.

Also, the data structures of blocks and pages are uniform independently of the attributes of the data stored therein. Thus, an unused block can be determined readily by referencing the physical address of the block, without the need to search for an unused block at another hierarchical layer. That is, since the processing to search for an unused block is not required in an operation to write data, the data can be written into an unused block at a high speed to lighten the processing load. This fast processing is particularly effective for a case in which data to be recorded is data observed along the time axis such as audio data or motion-picture data that requires real-time processing.

What is claimed is:

1. A memory controller for reading data stored in a nonvolatile memory that includes a plurality of erasable blocks containing a plurality of pages, the memory controller comprising:

reading means for searching and reading a logical/physical address control table stored in a logical/physical address control table block of the nonvolatile memory;

table construction means for constructing the logical/physical address control table based on data read out from the logical/physical address control table block of the nonvolatile memory; and writing means for writing data into the logical/physical address control table constructed in the nonvolatile memory.

2. The memory controller of claim 1 wherein the logical/physical address control table is stored in the logical/physical address control table block of the nonvolatile memory by storing the physical addresses in an order of the corresponding logical addresses.

3. The memory controller of claim 1 wherein the physical address of an unused block is stored in the logical/physical address control table block.

4. The memory controller of claim 1 wherein each logical address is stored in each corresponding block of the nonvolatile memory.

5. The memory controller of claim 1 wherein the reading means read only necessary data of the logical/physical address control table.

6. A method for reading data stored in a nonvolatile memory that includes a plurality of erasable blocks containing a plurality of pages, the method comprising the steps of:

searching and reading a logical/physical address control table stored in a logical/physical address control table block of the nonvolatile memory;

constructing the logical/physical address control table based on data read out from the logical/physical address control table block of the nonvolatile memory; and writing data into the logical/physical address control table of the nonvolatile memory constructed in the step of constructing.

7. The method of claim 6 wherein the logical/physical address control table is stored in the logical/physical address control table block of the nonvolatile memory by storing the physical addresses in an order of the corresponding logical addresses.

8. The method of claim 6 wherein the physical address of an unused block is stored in the logical/physical address control table block.

9. The method of claim 6 further comprising the step of only reading out necessary data from the logical/physical address control table.

* * * * *